(12) United States Patent
Lim et al.

(10) Patent No.: US 10,904,053 B2
(45) Date of Patent: Jan. 26, 2021

(54) METHOD FOR TRANSMITTING OR RECEIVING WAKE-UP SIGNAL IN WIRELESS LAN SYSTEM DEVICE THEREFOR

(71) Applicant: LG ELECTRONICS INC., Seoul (KR)

(72) Inventors: Dongguk Lim, Seoul (KR); Eunsung Park, Seoul (KR); Hangyu Cho, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/338,412

(22) PCT Filed: Sep. 18, 2017

(86) PCT No.: PCT/KR2017/010168
§ 371 (c)(1),
(2) Date: Mar. 29, 2019

(87) PCT Pub. No.: WO2018/062739
PCT Pub. Date: Apr. 5, 2018

(65) Prior Publication Data
US 2019/0268192 A1 Aug. 29, 2019

Related U.S. Application Data

(60) Provisional application No. 62/401,894, filed on Sep. 30, 2016, provisional application No. 62/403,722, (Continued)

(51) Int. Cl.
*H04L 27/06* (2006.01)
*H04L 27/26* (2006.01)
(Continued)

(52) U.S. Cl.
CPC ............. *H04L 27/06* (2013.01); *H04L 5/0012* (2013.01); *H04L 27/2666* (2013.01);
(Continued)

(58) Field of Classification Search
CPC . H04L 5/0092; H04L 5/0048; H04L 27/2647; H04L 27/06; H04L 27/2602;
(Continued)

(56) References Cited

U.S. PATENT DOCUMENTS

2003/0119568 A1 6/2003 Menard
2013/0336188 A1* 12/2013 Yomo ............... H04W 52/0206
370/311
(Continued)

FOREIGN PATENT DOCUMENTS

KR 1020150074148 7/2015
WO 2014084665 6/2014
WO 2015041464 3/2015

OTHER PUBLICATIONS

PCT International Application No. PCT/KR2017/010168, International Search Report dated Jan. 2, 2018, 4 pages.
(Continued)

*Primary Examiner* — Maharishi V Khirodhar
*Assistant Examiner* — Kenneth P Hunt
(74) *Attorney, Agent, or Firm* — Lee Hong Degerman Kang Waimey

(57) ABSTRACT

A method for receiving, by an STA, a WUR signal in a wireless LAN system according to an embodiment of the present invention comprises the steps of: monitoring at least one sub-band among multiple sub-bands included in a wireless LAN band through a WUR receiver of the STA in a state in which a wireless LAN receiver of the STA has been turned off; and outputting a wake-up signal to the wireless LAN receiver through the WUR receiver of the STA when
(Continued)

a WUR signal for the STA is detected as a result of monitoring the at least one sub-band, wherein the WUR signal includes a wireless LAN preamble transmitted in an OFDM scheme and a WUR payload transmitted in an OOK scheme, the STA detects the WUR signal on the basis of the OOK scheme, thereby acquiring only the WUR payload other than the wireless LAN preamble, and at least one sub-band that the STA monitors may be determined to be specific to a BSS associated by the STA.

13 Claims, 18 Drawing Sheets

Related U.S. Application Data filed on Oct. 4, 2016, provisional application No. 62/408,068, filed on Oct. 14, 2016, provisional application No. 62/430,935, filed on Dec. 7, 2016.

(51) Int. Cl.
*H04L 5/00* (2006.01)
*H04W 52/02* (2009.01)
*H04W 84/12* (2009.01)

(52) U.S. Cl.
CPC ....... *H04W 52/02* (2013.01); *H04W 52/0229* (2013.01); *H04W 84/12* (2013.01); *Y02D 30/70* (2020.08)

(58) Field of Classification Search
CPC . H04L 27/2666; H04L 5/0012; H04L 5/0023; H04W 52/02; H04W 52/0229; H04W 84/12; H04W 52/0235; H04W 52/0225; H04W 52/0212; H04W 52/0216; H04W 52/0222; H04W 52/0209–52/0296; H04W 52/00; H04W 4/80; Y02D 70/10; Y02D 70/00; Y02D 70/14
See application file for complete search history.

(56) References Cited

U.S. PATENT DOCUMENTS

| | | | |
|---|---|---|---|
| 2016/0337973 A1* | 11/2016 | Park | H04L 27/2613 |
| 2017/0111858 A1* | 4/2017 | Azizi | H04L 5/0053 |
| 2018/0077641 A1* | 3/2018 | Yang | H04L 69/22 |

OTHER PUBLICATIONS

Tang, S. et al., "Wake-up receiver for radio-on-demand wireless LANs", EURASIP Journal on Wireless Communications and Networking, Jan. 2012, 13 pages.

\* cited by examiner (a)

(b)

(a)

(b)

METHOD FOR TRANSMITTING OR RECEIVING WAKE-UP SIGNAL IN WIRELESS LAN SYSTEM DEVICE THEREFOR

CROSS-REFERENCE TO RELATED APPLICATIONS

[0] This application is the National Stage filing under 35 U.S.C. 371 of International Application No. PCT/KR2017/0010168, filed on Sep. 18, 2017, which claims the benefit of U.S. Provisional Application No. 62/401,894, filed on Sep. 30, 2016, 62/403,722, filed on Oct. 4, 2016, 62/408,068, filed on Oct. 14, 2016, and 62/430,935, filed on Dec. 7, 2016, the contents of which are all hereby incorporated by reference herein in their entirety.

BACKGROUND OF THE INVENTION

Field of the Invention

The present invention relates to a method for transmitting and receiving a frame in a wireless LAN system and, more specifically, to a method for transmitting or receiving a low-power wake-up receiver (LP-WUR) signal compatible with an 802.11 wireless LAN system and a device therefor.

Related Art

A standard for the wireless LAN technology is being developed as an Institute of Electrical and Electronics Engineers (IEEE) 802.11 standard. IEEE 802.11a and b use an unlicensed band in 2.4. GHz or 5 GHz. And, IEEE 802.11b provides a transmission rate of 11 Mbps, and IEEE 802.11a provides a transmission rate of 54 Mbps. And, IEEE 802.11g provides a transmission rate of 54 Mbps by applying orthogonal frequency-division multiplexing (OFDM). IEEE 802.11n provides a transmission rate of 300 Mbps on 4 spatial streams by applying multiple input multiple output-OFDM (MIMO-OFDM). The IEEE 802.11n supports a channel bandwidth of up to 40 MHz, and, in this case, the IEEE 802.11n provides a transmission rate of 600 Mbps.

The above-described wireless LAN (WLAN) standard was previously defined as the IEEE 802.11ac standard, which uses a maximum bandwidth of 160 MHz, supports 8 spatial streams, and supports a maximum rate of 1 Gbit/s. And, discussions are now being made on the IEEE 802.11ax standardization.

SUMMARY OF THE INVENTION

An object of the present invention is to provide a method for efficiently and accurately transmitting or receiving a low-power wake-up receiver (LP-WUR) signal compatible with an 802.11 wireless LAN system and a device therefor.

The present invention is not limited to the above-described technical task and other technical tasks can be inferred from embodiments of the present invention.

To accomplish the aforementioned object, a method for receiving, by a station (STA), a wake-up receiver (WUR) signal in a wireless LAN system according to one aspect of the present invention includes: monitoring at least one of a plurality of sub-bands included in a wireless LAN band through a WUR receiver of the STA in a state in which a wireless LAN receiver of the STA is turned off; and outputting a wake-up signal to the wireless LAN receiver through the WUR receiver of the STA when a WUR signal for the STA is detected as a result of monitoring the at least one sub-band, wherein the WUR signal may include a wireless LAN preamble transmitted in an orthogonal frequency division multiplex (OFDM) scheme and a WUR payload transmitted in an on-off keying (OOK) scheme, the STA may detect the WUR signal based on the OOK scheme, thereby acquiring only the WUR payload other than the wireless LAN preamble, and at least one sub-band monitored by the STA may be determined to be specific to a BSS with which the STA is associated.

To accomplish the aforementioned object, a station (STA) for receiving a wake-up receiver (WUR) signal in a wireless LAN system according to another aspect of the present invention includes: a wireless LAN receiver for receiving a wireless LAN signal; and a WUR receiver for monitoring at least one of a plurality of sub-bands included in a wireless LAN band in a state in which the wireless LAN receiver is turned off and outputting a wake-up signal to the wireless LAN receiver when a WUR signal for the STA is detected as a result of monitoring the at least one sub-band, wherein the WUR signal may include a wireless LAN preamble transmitted in an orthogonal frequency division multiplex (OFDM) scheme and a WUR payload transmitted in an on-off keying (OOK) scheme, the WUR receiver may detect the WUR signal based on the OOK scheme, thereby acquiring only the WUR payload other than the wireless LAN preamble, and at least one sub-band monitored by the WUR receiver may be determined to be specific to a BSS with which the STA is associated.

To accomplish the aforementioned object, a method for transmitting, by an access point (AP), a wake-up receiver (WUR) signal in a wireless LAN system according to another aspect of the present invention includes: generating a WUR signal including a wireless LAN preamble and a WUR payload; and transmitting the WUR signal to a station (STA) with a wireless LAN receiver turned off through at least one of a plurality of sub-bands included in a wireless LAN band, wherein the wireless LAN preamble may be transmitted in an orthogonal frequency division multiplex (OFDM) scheme, the WUR payload may be transmitted by reusing an OFDM transmitter of the AP for the wireless LAN preamble in an on-off keying (OOK) scheme, and at least one sub-band through which the WUR signal is transmitted may be determined to be specific to a BSS operated by the AP.

According to another aspect of the present invention, an AP device for performing the above-described method for transmitting a WUR signal may be provided.

At least one sub-band monitored by the STA may be determined through a BSSID (BSS identifier) or a BSS color of the BSS.

At least one sub-band monitored by the STA may be determined based on a first mathematical expression of "MOD(L, N_S)", wherein "L" represents the BSSID or the BSS color, "N_S" represents the number of sub-bands included in the wireless LAN band, and "MOD" represents a modulo operation in the first mathematical expression.

The number of sub-bands may be determined based on a second mathematical expression of "floor[N/K]", wherein "N" is the number of subcarriers included in the wireless LAN band and "K" is the number of subcarriers used for WUR signal transmission in the second mathematical expression.

The STA may monitor the WUR signal while hopping at least two sub-bands among the plurality of sub-bands.

The hopping of at least two sub-bands may be performed based on the BSSID (BSS identifier) or the BSS color of the BSS.

The STA may receive, from an access point (AP) of the BSS, WUR configuration information including at least one of allocation information about the plurality of sub-bands, sub-band size information and sub-band hopping information.

The WUR configuration information may be acquired from a beacon frame, a control frame or a management frame received through the wireless LAN receiver instead of the WUR receiver.

WUR signals for other STAs may be transmitted over sub-bands other than at least one sub-band over which the WUR signal for the STA is transmitted among the plurality of sub-bands.

According to an embodiment of the present invention, it is possible to reduce power consumption of STAs by providing an LP-WUR compatible with a wireless LAN system and randomize interference of WUR signals between BSSs by BSS-specifically determining or hopping a band or a sub-band in which WUR signals are transmitted.

Technical effects other than the aforementioned technical effects can be inferred from embodiments of the present invention.

DESCRIPTION OF EXEMPLARY EMBODIMENTS

Hereinafter, the preferred embodiment of the present invention will be described in detail with reference to the appended drawings. The detailed description that will hereinafter be disclosed along with the appended drawings will only be provided to describe an exemplary embodiment of the present invention. And, therefore, it should be understood that the exemplary embodiment presented herein will not represent the only embodiment for carrying out the present invention.

The following detailed description includes specific details for providing a full understanding of the present invention. However, it will be apparent to anyone skilled in the art that the present invention can be carried out without referring to the above-mentioned specific details. In some cases, in order to avoid any ambiguity in the concept of the present invention, the disclosed structure and device may be omitted, or the disclosed structure and device may be illustrated as a block diagram based on their core functions.

As described above, the following description pertains to a method for efficiently using a channel having a wide band in a wireless LAN system and a device therefor. To this end, a wireless LAN system to which the present invention is applied will be described in detail.

Figure 1:
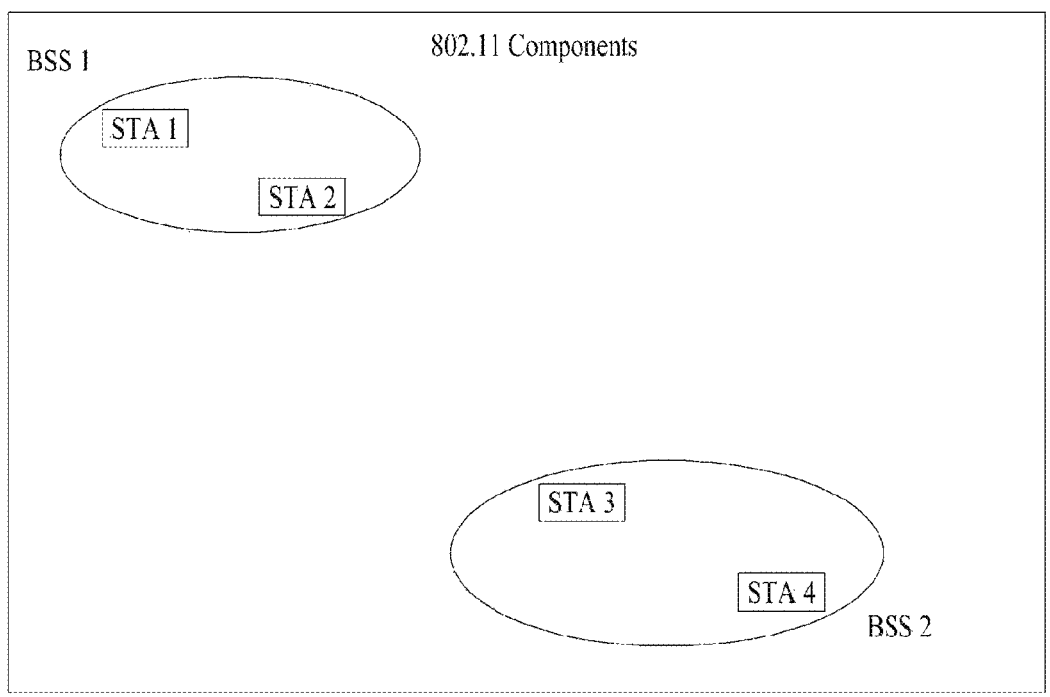
FIG. 1 is a diagram showing an exemplary configuration of a wireless LAN (WLAN) system.

FIG. 1 is a diagram showing an exemplary configuration of a wireless LAN (WLAN) system.

As shown in FIG. 1, a wireless LAN (WLAN) includes one or more Basic Service Set (BSS). A BSS is a set (or group) of stations (STAs) that successfully achieve synchronization so as to communication with one another.

As a logical entity including a Medium Access Control (MAC) and a Physical Layer interface for a wireless medium, an STA includes an access point (AP) and a non-AP Station. Among the STAs, a portable device (or terminal) that is operated by a user corresponds to a non-AP Station. And, therefore, when an entity is simply mentioned to as an STA, the STA may also refer to a non-AP Station. Herein, the non-AP Station may also be referred to as other terms, such as a terminal, a wireless transmit/receive unit (WTRU), a user equipment (UE), a mobile station (MS), a mobile terminal, a mobile subscriber unit, and so on.

Additionally, the AP is an entity providing its associated station (STA) with an access to a distribution system (DS) through a wireless medium. Herein, the AP may also be referred to as a centralized controller, a base station (B), a Node-B, a base transceiver system (BTS), a personal basic service set central point/access point (PCP/AP), a site controller, and so on.

A BSS may be categorized as an infrastructure BSS and an independent BSS (IBSS).

The BSS shown in FIG. 1 corresponds to an IBSS. The IBSS refers to a BSS that does not include an AP. And, since the BSS does not include an AP, access to the DS is not authorized (or approved), and, therefore, the IBSS functions as a self-contained network.

Figure 2:
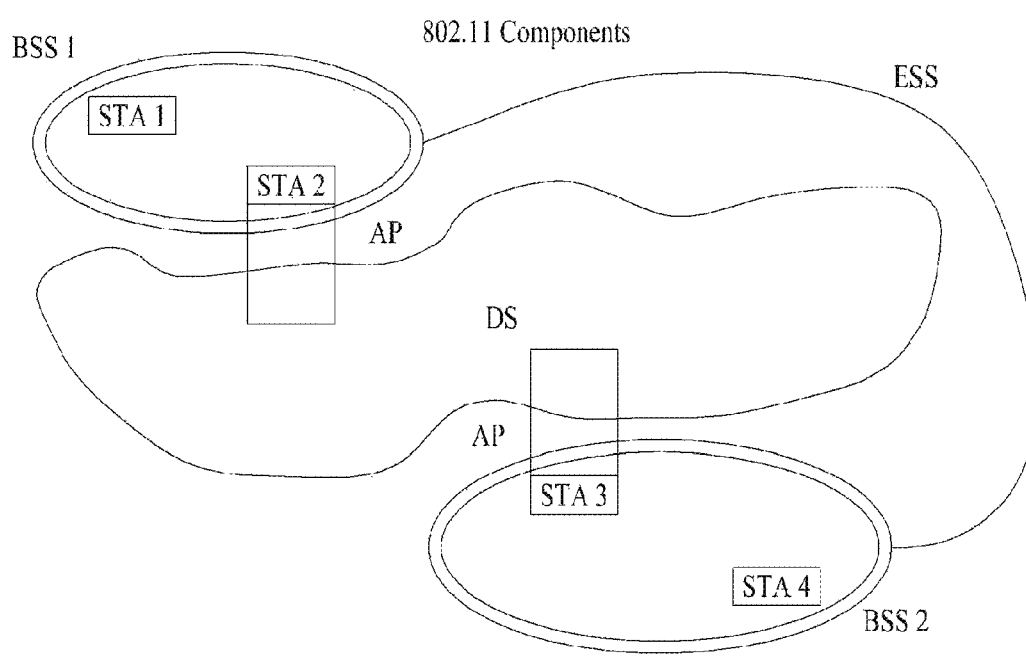
FIG. 2 is a diagram showing another exemplary configuration of a wireless LAN (WLAN) system.

FIG. 2 is a diagram showing another exemplary configuration of a wireless LAN (WLAN) system.

The BSS shown in FIG. 2 corresponds to an infrastructure BSS. The infrastructure BSS includes one or more STAs and APs. As a rule, although the communication between non-AP STAs is established by passing through the AP, in case a direct link is configured between the non-AP STAs, direct communication may also be established between the non-AP STAs.

As shown in FIG. 2, a plurality of infrastructure BSSs may be interconnected to one another through the DS. The plurality of BSSs being interconnected to one another through the DS is collectively referred to as an extended service set (ESS). The STAs being included in the ESS may perform communication between one another, and, a non-AP STA may shift (or relocate) from one BSS to another BSS within the same ESS while performing uninterrupted communication.

As a mechanism that connects the plurality of APs, the DS is not necessarily required to correspond to a network. As long as the DS is capable of providing a predetermined distribution service, there is no limitation in the structure or configuration of the DS. For example, the DS may correspond to a wireless network, such as a mesh network, or the DS may correspond to a physical structure (or entity) that connects the APs to one another.

Layer Structure

The operation of an STA operating in a wireless LAN system can be described from the viewpoint of a layer structure. A layer structure can be realized by a processor in terms of device configuration. An STA may have a structure of multiple layers. For example, a layer structure mainly handled in 802.11 standard document is a MAC sublayer and a physical layer (PHY) on a data link layer (DLL). The PHY may include a physical layer convergence procedure (PLCP) entity, a physical medium dependent (PMD) entity, and the like. The MACK sublayer and PHY conceptually includes management entities called a MAC sublayer management entity (MLME) and a physical layer management entity (PLME), respectively. These entities provide a layer management service interface in which a layer management function operates.

To provide a correct MAC operation, a station management entity (SME) is present in each STA. The SME is a layer-independent entity which may be regarded as being present in a separate management plane or off to the side. Although correct functions of the SME are not described in detail in this document, the SME may be considered to serve to collect layer-dependent states from various layer management entities (LMEs) and set similar layer-specific parameter values in general. The SME can execute such functions on behalf of a general system management entity and realize a standard management protocol.

The aforementioned entities interact with each other in various manners. For example, entities can interact with each other by exchanging GET/SET primitives. A primitive refers to a set of elements or parameters related to a specific purpose. XX-GET.request primitive is used to request a value of given MIB attribute (management information based attribute information). XX-GET.confirm primitive is used to return an appropriate MIB attribute information value if the status is "successful" and return an error indication in a status field if not. XX-SET.request primitive is used to request an indicated MIB attribute to be set as a given value. When the MIB attribute means a specific operation, this requests the operation to be performed. In addition, XX-SET.confirm primitive is used to confirm that an indicated MIB attribute has been set to a requested value if the status is "successful" and return an error condition to the status field if not. When the MIB attribute means a specific operation, this confirms that the operation has been performed.

Further, the MLME and the SME can exchange various MLME_GET/SET primitives through an MLME_SAP (Service Access Point). In addition, various PLME_GET/SET primitives can be exchange between the PLME and the SME through PLME_SAP and exchanged between the MLME and the PLME through MLME-PLME_SAP.

Link Setup Procedure

Figure 3:
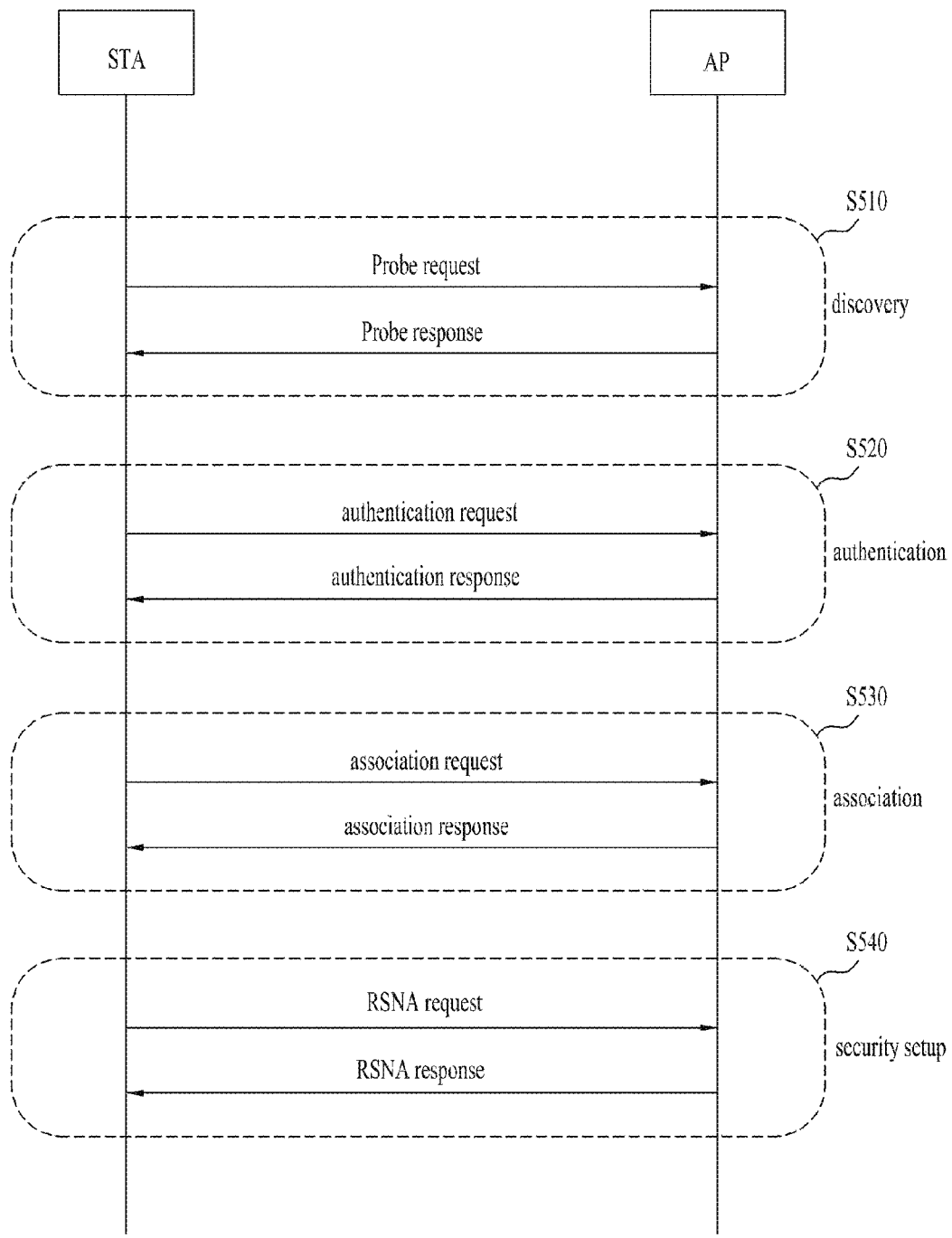
FIG. 3 is a diagram for describing a general link setup procedure.

FIG. 3 is a diagram for describing a general link setup procedure.

To set up a link with respect to a network and transmit/receive data, an STA needs to discover the network, perform authentication, establish association and perform an authentication procedure for security. The link setup procedure may also be referred to as a session initiation procedure and a session setup procedure. Further, the discovery, authentication, association and security setup process of the link setup procedure may be referred to as an association process.

An exemplary link setup procedure will be described with reference to FIG. 3.

In step S510, the STA may perform a network discovery operation. The network discovery operation may include a scanning operation of the STA. That is, the STA needs to discover a network in which the STA can participate in order to access the network. The STA needs to identify a compatible network before participating in a wireless network. A process of identifying a network present in a specific area is called scanning Scanning includes active scanning and passive scanning FIG. 3 illustrates a network discovery operation including active scanning An STA that performs active scanning transmits a probe request frame in order to search neighboring APs while moving to channels and waits for a response to the probe request frame. A responder transmits a probe response frame as a response to the probe request frame to the STA that has transmitted the probe request frame. Here, the responder may be an STA that has transmitted a last beacon frame in a BSS of a channel that is being scanned. An AP is a responder in a BSS because the AP transmits a beacon frame, whereas a responder is not fixed in an IBSS because STAs transmit a beacon frame in turn. For example, an STA that has transmitted a probe request frame in channel #1 and received a probe response frame in channel #1 can store BSS related information included in the received probe response frame, move to the next channel (e.g., channel #2) and perform scanning (i.e., probe request/response transmission/reception) through the same method.

Although not shown in FIG. 3, passive scanning may be performed as a scanning method. In passive scanning, an STA that performs scanning waits for a beacon frame while moving to channels. The beacon frame is one of management frames in IEEE 802.11 which indicates presence of a wireless network and is periodically transmitted such that an STA performing scanning can discover a wireless network and participate therein. An AP serves to periodically transmit the beacon frame in a BSS and STAs transmit the beacon frame in turn in an IBSS. An STA performing scanning stores information about a BSS included in a beacon frame upon reception of the beacon frame and records beacon frame information in each channel while moving to other channels. An STA that has received a beacon frame can store BSS related information included in the received beacon frame, move to the next channel and perform scanning in the next channel in the same manner.

Comparing active scanning with passive scanning, active scanning has less delay and power consumption than passive scanning After the STA discovers a network, an authentication process can be performed in step S520. This authentication process may be referred to as a first authentication process to be clearly discriminated from a security setup process in step S540 which will be described later.

The authentication process includes a process through which the STA transmits an authentication request frame to an AP and a process through which the AP transmits an authentication response frame in response to the authentication request frame to the STA. Authentication frames used for authentication request/response correspond to management frames.

An authentication frame may include information about an authentication algorithm number, an authentication transaction sequence number, status code, a challenge text, a robust security network (RSN), a finite cyclic group, and the like. This corresponds to some examples of information that can be included in authentication request/response frames and may be replaced by other information or may include additional information.

The STA may transmit the authentication request frame to the AP. The AP may determine whether to permit authentication of the STA based on information included in the received authentication request frame. The AP may provide an authentication processing result to the STA through an authentication response frame.

After successful authentication of the STA, an association process can be performed in step S530. The association process includes a process through which the STA transmits an association request frame to the AP and a process through which the AP transmits an association response frame to the STA.

For example, the authentication request frame may include information such as information about various capabilities, a beacon listen interval, a service set identifier (SSI), supported rates, supported channels, an RSN, a mobility domain, supported operating classes, traffic indication map (TIM) broadcast request, an interworking service capability, and the like.

For example, the association response frame may include information such as information about various capabilities, status code, an association ID (AID), supported rates, an enhanced distributed channel access (EDCA) parameter set, a received channel power indicator (RCPI), a received signal to noise indicator (RSNI), a mobility domain, a timeout interval (association comeback time), an overlapping BSS scan parameter, a TIM broadcast response, a QoS map, and the like.

The aforementioned information corresponds to some examples of information that can be included in the association request/response frames and may be replaced by other information or may include additional information.

After successful association of the STA with the network, the security setup process can be performed in step S540. The security setup process in step S540 may also be called an authentication process through robust security network association (RSNA) request/response, and the authentication process of step S520 may be referred to as the first authentication process and the security setup process of step S540 may be simply referred to as an authentication process.

The security setup process of step S540 may include a private key setup process through 4-way handshaking using an extensible authentication protocol over LAN (EAPOL) frame. Further, the security setup process may be performed according to a security scheme that is not defined in IEEE 802.11 standards.

Medium Access Mechanism

In IEEE 802.11 wireless LAN systems, a basic access mechanism of medium access control (MAC) is a Carrier Sense Multiple Access with Collision Avoidance (CSMA/CA) mechanism. The CSMA/CA mechanism is also called a distributed coordination function (DCF) of IEEE 802.11 MAC and basically employs a "listen before talk" access mechanism. According to this type of access mechanism, an AP and/or an STA can perform clear channel assessment of sensing a radio channel or a medium for a predetermined duration (e.g., a DCF inter-frame space (DIFS) prior to start of transmission. If a medium is determined to be in an idle status as a sensing result, frame transmission is started through the medium. On the other hand, it is detected that the medium is in an occupied status, the AP and/or the STA may set a delay period (e.g., a random backoff period) for medium access, wait for the delay period and then attempt frame transmission instead of starting transmission thereof. Application of the random backoff period can minimize collision because a plurality of STAs is expected to attempt frame transmission after waiting for difference periods of time.

Further, IEEE 802.11 MAC protocol provides a hybrid coordination function (HCF). The HCF is based on the DCF and a point coordination function (PCF). The PCF is a polling based synchronous access method and refers to periodic polling for allowing all reception APs and/or STAs to receive data frames. In addition, the HCF has enhanced distributed channel access (EDCA) and HCF controlled channel access (HCCA). EDCA uses a contention-based access method for a provider to provide data frames to a plurality of users and HCCA uses a contention-free-based channel access method using a polling mechanism. Further, the HCF includes a medium access mechanism for improving quality of service (QoS) of a WLAN and can transmit QoS data in both a contention period (CP) and a content-free period (CFP).

Figure 4:
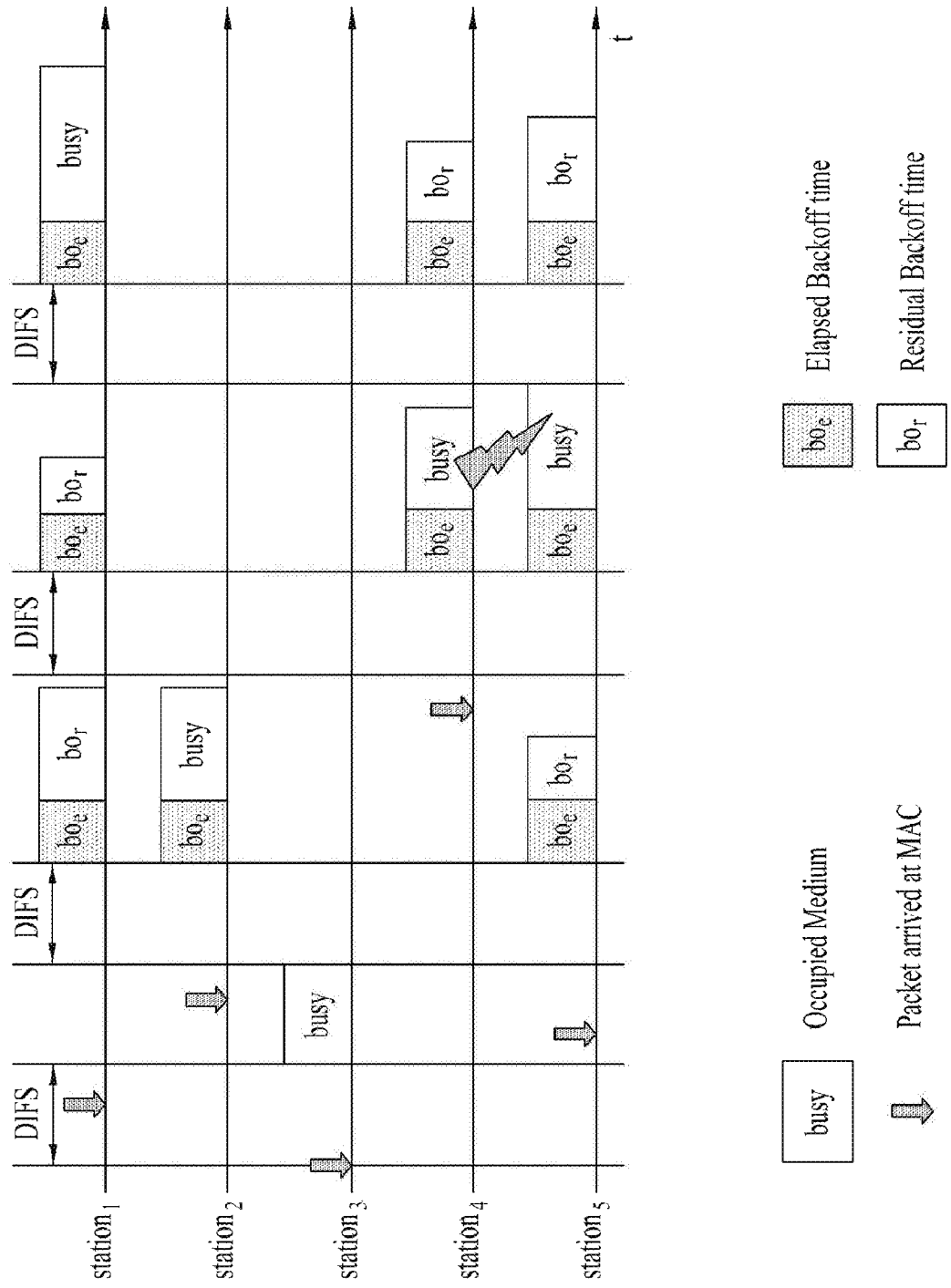
FIG. 4 is a diagram for describing a backoff procedure.

FIG. 4 is a diagram for describing a backoff procedure.

An operation based on a random backoff period will be described with reference to FIG. 4. When a medium in an occupied (or busy) status switches to an idle status, STAs can attempt data (or frame) transmission. Here, each STA can select a random backoff count, wait for a slot duration corresponding to the random backoff count and then attempt transmission in order to minimize collision. A random backoff count has a packet number value and can be determined as one of values in the range of 0 to CW. Here, CW is a contention window parameter value. Although CWmin is provided as an initial value of the CW parameter, the CW parameter can have a double value in the case of transmission failure (for example, when ACK for a transmitted frame cannot be received). When the CW parameter value reaches CWmax, it is possible to attempt data transmission while maintaining the value of CWmax until data transmission is successfully performed. The CW parameter value is reset to CWmin when data transmission has been successfully performed. It is desirable that CW, CWmin and CWmax be set to $2^n-1$ (n=0, 1, 2, . . . ).

When a random backoff procedure starts, an STA continuously monitors a medium while counting down backoff slots according to a determined backoff count value. The STA stops countdown and waits when the STA monitors that the medium in an occupied status and resumes countdown when the medium switches to an idle status.

Figure 6:
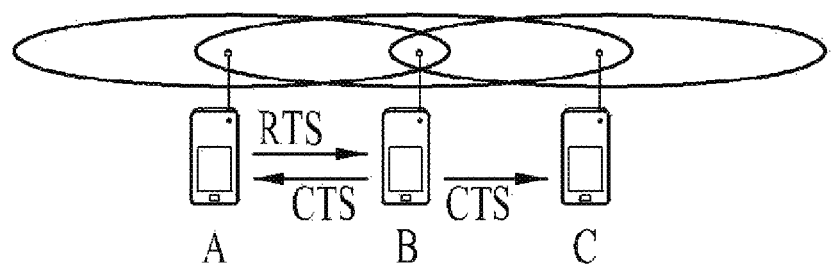
FIG. 6 is a diagram for describing RTS and CTS.
Figure 6:
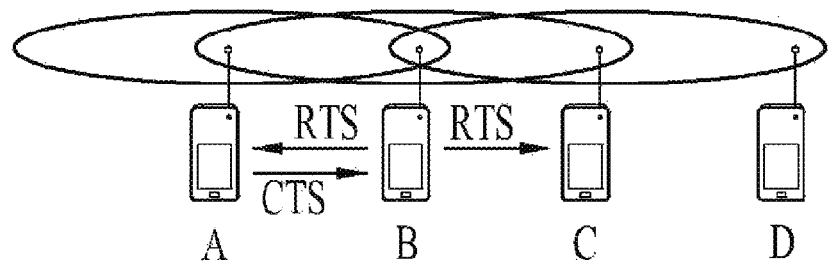

When a packet to be transmitted arrives at the MAC of STA3 in the example of FIG. 4, STA3 can confirm that a medium is in an idle status for DIFS and immediately transmit a frame. Other STAs monitor that the medium is in a busy status and wait. During this period, data to be transmitted may be generated in STA1, STA2 and STA5, and each STA can wait for DIFS and then count down backoff slots according to a random backoff count value selected thereby when it is monitored that the medium is in an idle status. The example of FIG. 4 shows a case in which STA2 selects a smallest backoff count value and STA1 selects a largest backoff count value. That is, the example illustrates a case in which a remaining backoff time of STA5 at the point in time at when STA2 ends backoff count and starts frame transmission is shorter than a remaining backoff time of STA1. STA1 and STA5 temporarily stops countdown and wait while STA2 occupies the medium. When occupation of STA2 ends and the medium switches to an idle status again, STA1 and STA5 wait for DIFS and then resume stopped backoff count. That is, STA1 and STA5 can count down the remaining backoff slots for the remaining backoff time and then start frame transmission. Since the remaining backoff time of STA5 is shorter than that of STA1, STA5 starts frame transmission. Meanwhile, data to be transmitted may be generated in STA4 while STA2 occupies the medium. Here, STA4 can wait for DIFS, perform countdown according to a random backoff count value selected thereby and start frame transmission when the medium switches to an idle state. The example of FIG. 6 shows a case in which the remaining backoff time of STA5 is coincidentally consistent with the random backoff count value of STA4. In this case, a collision may occur between STA4 and STA5. When a collision occurs, both STA4 and STA4 cannot receive ACK and fail in data transmission. In this case, STA4 and STA5 can double a CW value, select a random backoff count value and perform countdown. Meanwhile, STA1 can wait while the medium is in an occupied status due to transmission of STA4 and STA5, wait for DIFS when the medium switches to an idle status and then start frame transmission when the remaining backoff time has elapsed.

Sensing Operation of STA

As described above, the CSMA/CA mechanism includes virtual carrier sensing in addition to physical carrier sensing by which an AP and/or an STA directly sense a medium. Virtual carrier sensing is to solve a problem that may be generated in medium access, such as a hidden node program. For virtual carrier sensing, MAC of a wireless LAN system can use a network allocation vector (NAV). The NAV is a value by which an AP and/or an STA that are currently using a medium or have the authority to use the medium indicate a remaining time until the medium is available to other APs and/or STAs. Accordingly, a value set to a NAV corresponds to a period in which a medium is scheduled to be used by an AP and/or an STA that transmit corresponding frames, and an STA that receives the NAV value is prohibited from accessing the medium during the period. A NAV can be set according to a value of "duration" field of a MAC header of a frame, for example.

Furthermore, a robust collision detection mechanism has been introduced in order to reduce possibility of collision. This will be described with reference to FIGS. 5 and 7. Although an actual carrier sensing range may not be consistent with a transmission range, it is assumed that they are consistent with each other for convenience of description.

Figure 5:
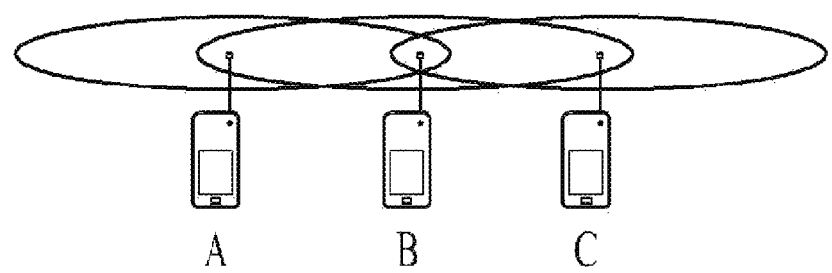
FIG. 5 is a diagram for describing a hidden node and an exposed node.
Figure 5:
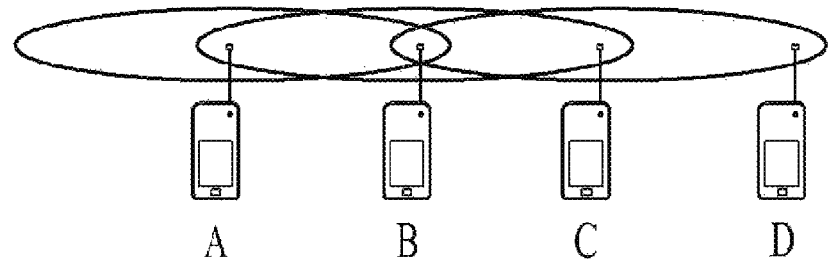

FIG. 5 is a diagram for describing a hidden node and an exposed node.

FIG. 5(*a*) illustrates a hidden node and shows a case in which STA A and STA B are communicating with each other and STA C has information to be transmitted. Specifically, while STA A is transmitting information to STA B, a medium may be determined to be in an idle status when STA C performs carrier sensing before sending data to STA B. This is because transmission (i.e., medium occupation) of STA A may not be sensed at the position of STA C. In such a case, STA B simultaneously receives information of STA A and STA C and thus a collision occurs. Here, STA A may be regarded as a hidden node of STA C.

FIG. 5(*b*) illustrates an exposed node and shows a case in which STA C has information to be transmitted to STA D while STA B is transmitting data to STA A. In this case, when STA C performs carrier sensing, a medium can be determined to be in an occupied status due to transmission of STA B. Accordingly, even if STA C has information to be transmitted to STA D, STA C needs to wait until the medium switches to an idle status because the occupied status of the medium is sensed. However, transmission from STA C and transmission from STA B may not collide from the viewpoint of STA A because STA A is out of the transmission range of STA C. Accordingly, STA C unnecessarily waits until STA B stops transmission. Here, STA C may be regarded as an exposed node of STA B.

FIG. 6 is a diagram for describing RTS and CTS.

To efficiently use a collision avoidance mechanism in an exemplary situation such as the example of FIG. 5, a short signaling packet such as RTS (request to send) and CTS (clear to send) can be used. RTS/CTS between two STAs can be caused to be overheard by neighbor STAs such that the neighbor STAs can consider whether information is transmitted between the two STAs. For example, when an STA that attempts to transmit data transmits an RTS frame to an STA that receives the data, the STA that receives the data can indicate that it will receive the data by transmitting a CTS frame to neighbor STAs.

FIG. 6(*a*) illustrates a method for solving a hidden node problem and assumes a case in which both STA A and STA C attempt to transmit data to STA B. When STA A sends RTS to STA B, STA B transmits CTS to both STA A and STA C around STA B. Consequently, STA C can avoid collision because it waits until data transmission of STA A and STA B ends.

FIG. 6(*b*) illustrates a method for solving an exposed node problem and shows a case in which STA C can determine that a collision does not occur even when STA C transmits data to other STAs (e.g., STA D) by overhearing RTS/CTS transmission between STA A and STA B. That is, STA B transmits RTS to all neighbor STAs and transmits CTS to STA A to which STA B will actually transmit data. Since STA C has received only RTS and has not received CTS of STA A, STA C can recognize that STA A is out of carrier sensing of STA C.

Power Management

As described above, an STA needs to perform channel sensing before performing transmission and reception in a wireless LAN system. Sensing a channel all the time causes continuous power consumption of the STA. Power consumption in a reception state does not considerably differ from power consumption in a transmission state, and continuous maintaining of a reception state is a considerable burden on an STA having limited power (i.e., operating by a battery). Accordingly, when an STA maintains a reception standby state in order to continuously sense channels, the STA inefficiently consumes power with no particular advantage with respect to wireless LAN throughput. To solve such a problem, wireless LAN systems support an STA power management (PM) mode.

The STA power management mode is divided into an active mode and a power save (PS) mode. An STA operates in the active mode by default. The STA operating in the active mode maintains an awake state. The awake state is a state in which a normal operation such as frame transmission and reception or channel scanning can be performed. On the other hand, an STA operating in the PS mode operates while switching to a sleep state (or doze state) and the awake state. An STA operating in the sleep state operates with minimum power and does not perform channel scanning as well as frame transmission and reception.

Since power consumption of an STA decreases as the STA operates in the sleep state as long as possible, the operation period of the STA increases. However, the STA cannot operate for a long time unconditionally because frame transmission and reception cannot be performed in the sleep state. When an STA operating in the sleep state has a frame to be transmitted to an AP, the STA switches to the awake state and can transmit the frame. Meanwhile, when an AP has a frame to be transmitted to STAs, an STA in the sleep state cannot receive the frame and cannot recognize presence of the frame to be transmitted. Accordingly, the STA may need to perform an operation of switching to the awake state at a specific interval in order to recognize presence or absence of a frame to be transmitted thereto (and in order to receive the frame if it is present).

An AP can transmit a beacon frame to STAs in a BSS at predetermined intervals. The beacon frame may include a traffic indication map (TIM) information element. The TIM information element may include information indicating that buffered traffic for STAs associating with the AP is present and the AP will transmit a frame. A TIM element includes a TIM used to indicate a unicast frame and a delivery traffic indication map (DTIM) used to indicate a multicast or broadcast frame.

Figure 7:
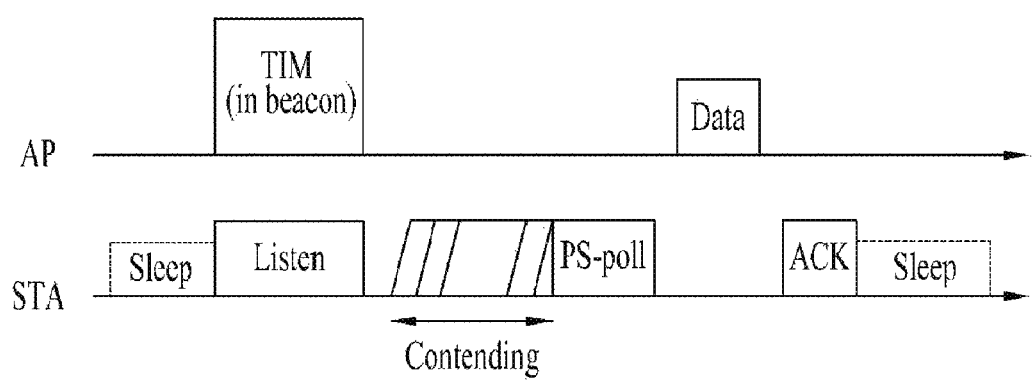
FIGS. 7 to 9 are diagrams for describing an operation of an STA which has received a TIM.
Figure 8:
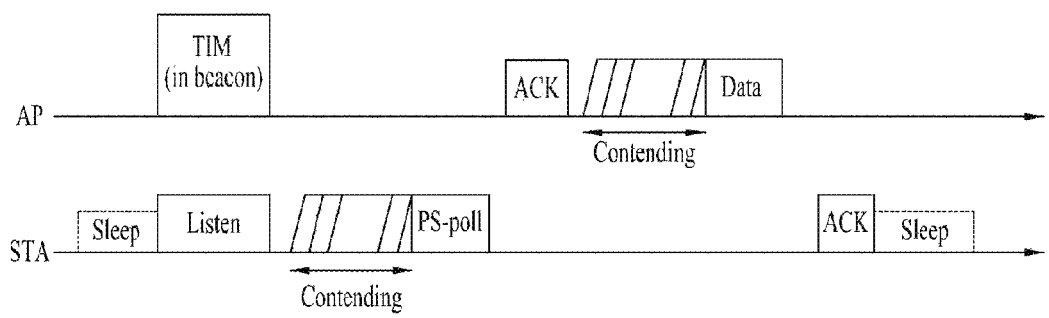
Figure 9:
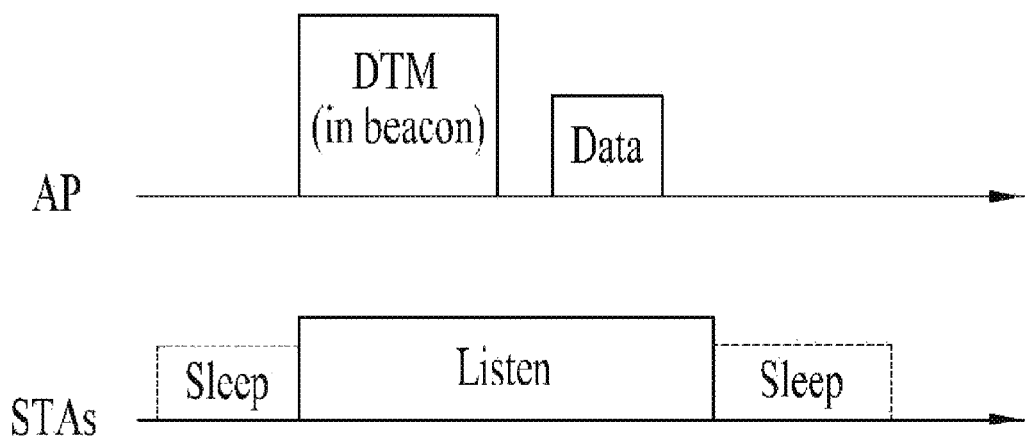

FIGS. 7 to 9 are diagrams for describing an operation of an STA that has received a TIM.

Referring to FIG. 7, an STA switches from a sleep state to an awake state in order to receive a beacon frame including a TIM from an AP and can be aware of presence of buffered traffic to be transmitted thereto by analyzing the received TIM element. The STA can perform contending with other STAs for medium access for PS-Poll frame transmission and then transmit a PS-Poll frame to request data frame transmission from the AP. Upon reception of the PS-Poll frame transmitted from the STA, the AP can transmit a frame to the STA. The STA can receive the data frame and transmit an ACK frame for the data frame to the AP. Thereafter, the STA can switch to a sleep state again.

As shown in FIG. 7, the AP can operate according to an immediate response method in which the AP receives the PS-Poll frame from the STA and then transmits a data frame after a predetermined time (e.g., short inter-frame space (SIFS)). On the other hand, when the AP has not prepared a data frame to be transmitted to the STA for SIFS after reception of the PS-Poll frame, the AP can operate according to a deferred response method. This will be described with reference to FIG. 8.

In the example of FIG. 8, an operation of the STA to switch from a sleep state to an awake state to receive a TIM from the AP and transmit a PS-Poll frame to the AP through contention is the same as that in the example of FIG. 7. When the AP has not prepared a data frame for SIFS although it has received the PS-Poll frame, the AP can transmit an ACK frame instead of the data frame to the STA. The AP can transmit the data frame to the STA after performing contending when the data frame is prepared after ACK frame transmission. The STA can transmit an ACK frame indicating that the data frame has been successfully received to the AP and switch to a sleep state.

FIG. 9 illustrates transmission of a DTIM by an AP. STAs can switch from a sleep state to an awake state in order to receive a beacon frame including a DTIM element from the AP. The STAs can recognize that a multicast/broadcast frame will be transmitted through the received DTIM. The AP can immediately transmit data (i.e., multicast/broadcast frame) after transmission of the beacon frame including the DTIM without an operation of transmitting/receiving a PS-Poll frame. The STAs can receive the data while continuously maintaining the awake state after reception of the beacon frame including the DTIM and switch to a sleep state again after completion of data reception.

General Frame Structure

Figure 10:
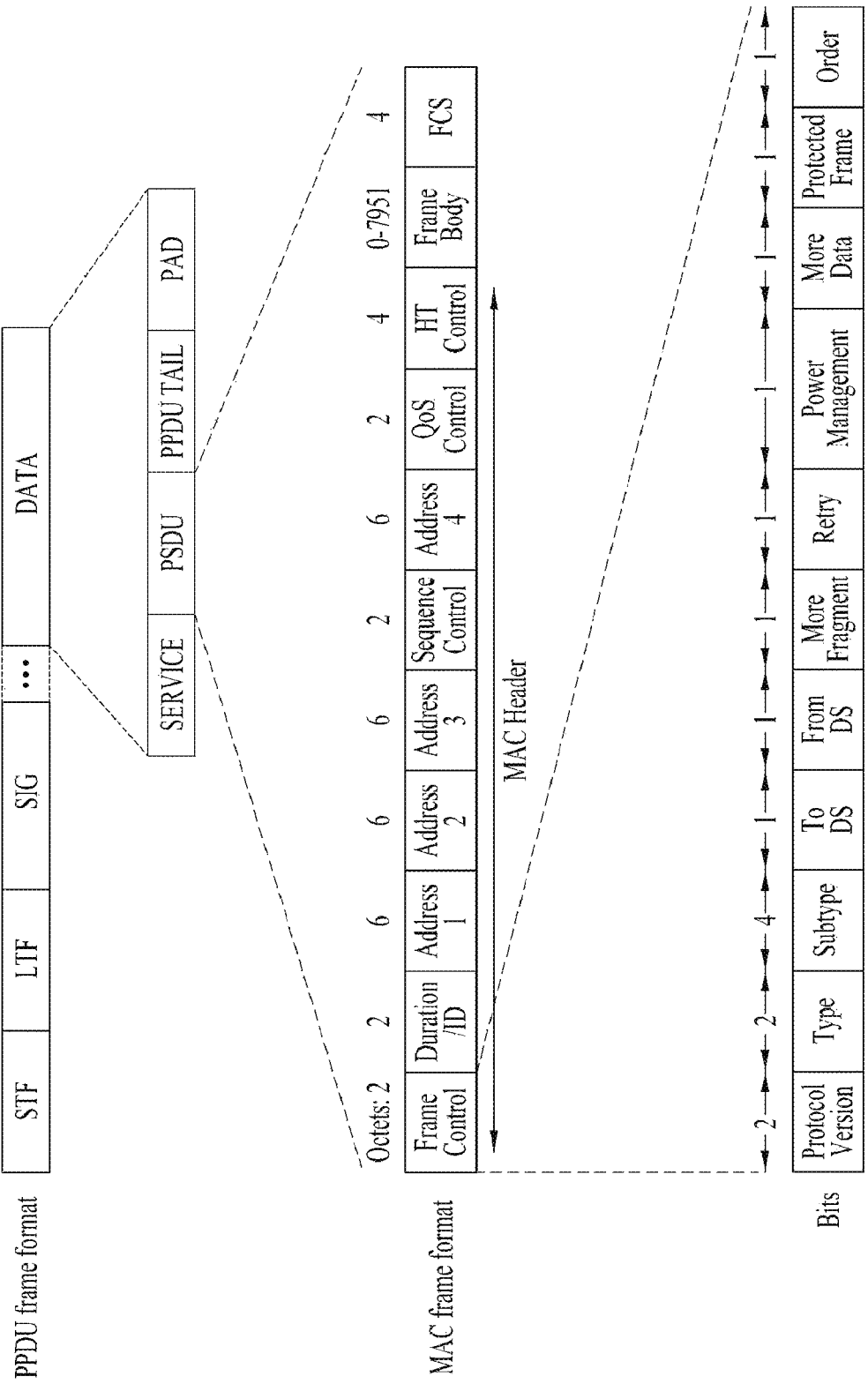
FIG. 10 is a diagram for describing an example of a frame structure used in an IEEE 802.11 system.

FIG. 10 is a diagram for describing an example of a frame structure used in IEEE 802.11.

A PPDU (Physical Layer Protocol Data Unit) frame format may include an STF (Short Training Field), an LTF (Long Training Field), a SIG (SIGNAL) field and a data field. The most basic (e.g., non-HT (High Throughput)) PPDU frame format may include only L-STF (Legacy-STF), L-LTF (Legacy-LTF), SIG and data fields.

STF is a signal for signal detection, AGC (Automatic Gain Control), diversity selection, accurate time synchronization, and the like and LTF is a signal for channel estimation, frequency error estimation, and the like. STF and LTF may be collectively called a PLCP preamble and the PLCP preamble may be regarded as a signal for OFDM physical layer synchronization and channel estimation.

The SIG field may include a RATE field and a LENGTH field. The RATE field may include information about data modulation and a coding rate. The LENGTH field may include information about a data length. Additionally, the SIG field may include a parity bit, a SIG TAIL bit, and the like.

The data field may include a SERVICE field, a PSDU (Physical layer Service Data Unit), a PPDU TAIL bit and also include a padding bit as necessary. Some bits of the SERVICE field can be used for synchronization of a descrambler at a receiving end. The PSDU corresponds to an MPDU (MAC Protocol Data Unit) defined in the MAC layer and may include data generated/used in a higher layer. The PPDU TAIL bit can be used to return an encoder to state 0. The padding bit can be used to set the length of the data field in a predetermined unit.

The MPDU is defined according to various MAC frame formats and a basic MAC frame includes a MAC header, a frame body and an FCS (Frame Check Sequence). The MAC frame is composed of the MPDU and may be transmitted/received through a PSDU of a data part of a PPDU frame format.

The MAC header includes a frame control field, a duration/ID field, an address field, and the like. The frame control field may include control information necessary for frame transmission/reception. The duration/ID field may be set to a time for transmitting a corresponding frame.

The duration/ID field included in the MAC header may be set to a 16-bit length (e.g., B0 to B15). Content included in the duration/ID field may vary according to frame type and sub-type, whether transmission is performed for a contention free period (CFP), and QoS capability of a transmission STA. (i) In a control frame having a sub-type of PS-Poll, the duration/ID field may include an AID of a transmission STA (e.g., through 14 LSBs) and 2 MSBs may be set to 1. (ii) In frames transmitted by a point coordinator (PC) or a non-QoS STA for a CFP, the duration/ID field may be set to a fixed value (e.g., 32768). (iii) In other frames transmitted by non-QoS STAs or control frames transmitted by QoS STAs, the duration/ID field may include a duration value defined per frame type. In a data frame or a management frame transmitted by a QoS STA, the duration/ID field may include a duration value defined per frame type. For example, when the duration/ID field is set to B15=0, it indicates that the duration/ID field is used to indicate a TXOP duration, and B0 to B14 may be used to indicate an actual TXOP duration. The actual TXOP duration indicated by B0 to B14 may be one of 0 to 32767 and the unit thereof may be μs. However, when the duration/ID field indicates a fixed TXOP duration value (e.g., 32768), B15=1 and B0 to B14=0 can be set. Further, when B14=1 and B15=1 are set, the duration/ID field is used to indicate an AID and B0 to B13 indicate one of 1 to 2007 AIDs. Refer to IEEE 802.11 standard documents for details of sequence control, QoS control, HT control subfields of the MAC header.

The frame control field of the MAC header may include Protocol Version, Type, Subtype, To DS, From DS, More Fragment, Retry, Power Management, More Data, Protected Frame and Order subfields. Refer to IEEE 802.11 standard documents for details of each subfield of the frame control field.

Low-Power Wake-Up Receiver (LP-WUR)

An overview of an LP-WUR that can be used in a wireless LAN system (e.g., 802.11) will be described with reference to FIG. 11.

Figure 11:
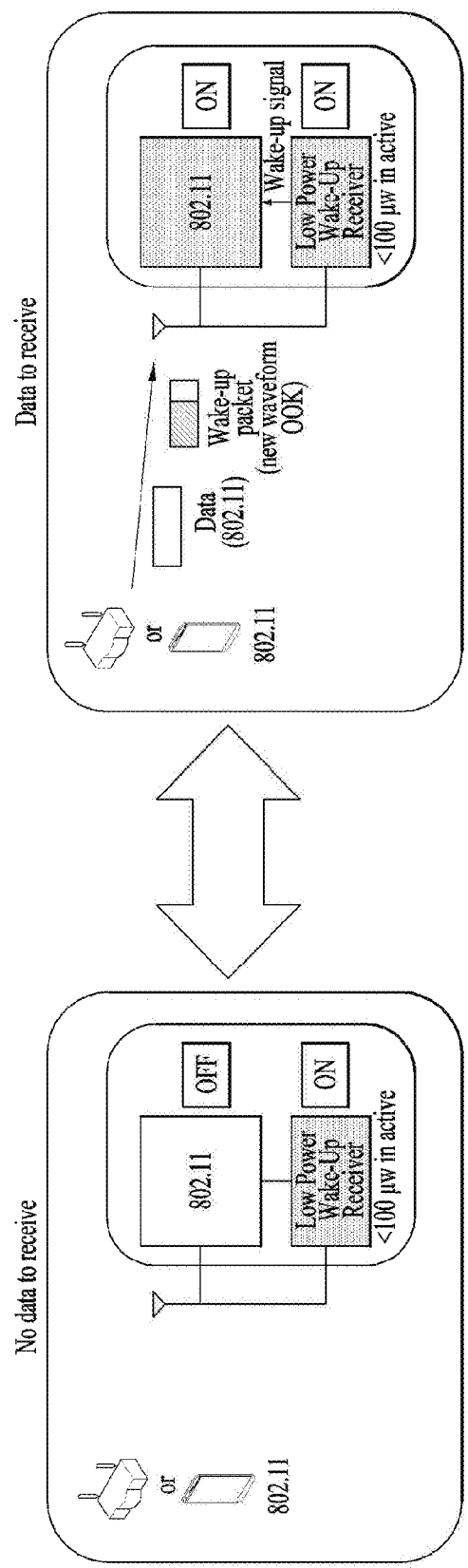
FIG. 11 illustrates an LP-WUR available in a wireless LAN system (e.g., 802.11).

Referring to FIG. 11, a receiver may be configured by combining a wireless LAN (hereinafter referred to as main radio) for main wireless communication and an LP-WUR.

The main radio is used to transmit and receive data and may be powered off when there is no data to be transmitted and received. When the main radio is powered off in this manner, the LP-WUR can wake the main radio up when there is a packet to be received. Accordingly, user data is transmitted and received through the main radio.

The LP-WUR is not used for user data and can serve to wake a receiver of the main radio up. The LP-WUR may have a simple receiver form without having a receiver and is activated while the main radio is turned off. It is desirable that target power consumption of the LP-WUR in an activated state do not exceed 100 µW. For such a low-power operation, a simple modulation method, for example, OOK (on-off keying) may be used and a narrow bandwidth (e.g., 4 MHz or 5 MHz) may be used. A target transmission range (e.g., distance) of the LP-WUR may currently correspond to 802.11.

Figure 12:
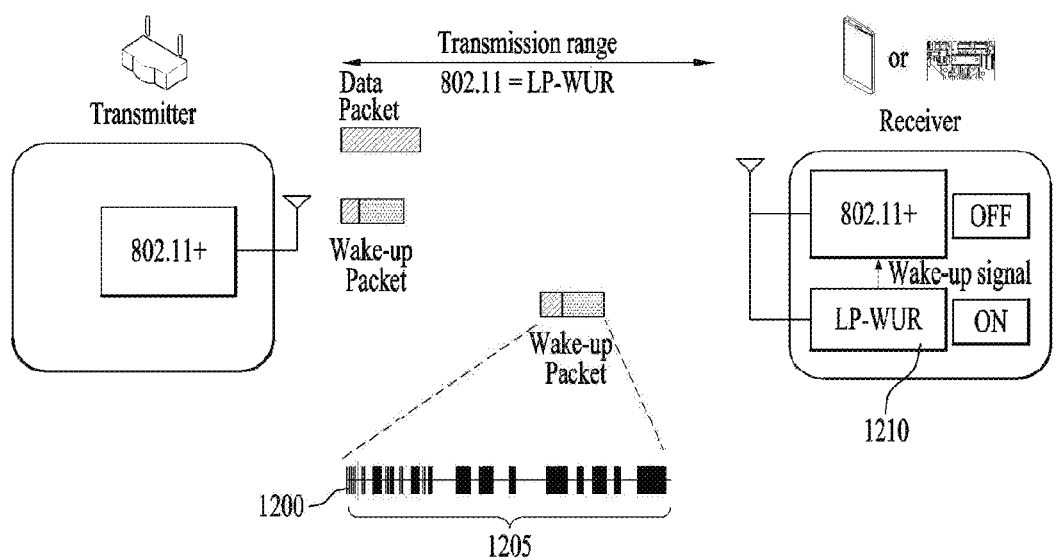
FIG. 12 is a diagram for describing the design and operation of an LP-WUR.

FIG. 12 is a diagram for describing a design and operation of the LP-WUR.

Referring to FIG. 12, a wake-up packet may include a wireless LAN preamble 1200 and a wake-up packet payload 1205.

The wireless LAN preamble 1200 is for coexistence with a wireless LAN system and L-SIG of a wireless LAN can be used as the wireless LAN preamble 1200 for packet protection. Accordingly, a 3rd Party legacy STA can be aware that a wake-up packet is not intended therefor through the wireless LAN preamble 1200 of the wake-up packet and the current medium of the wireless LAN has been occupied by another STA. However, the LP-WUR does not decode the wireless LAN preamble 1200 of the wake-up packet. This is because an LP-WUR supporting narrow bands and OOK demodulation does not support 802.11 signal reception.

A payload of a wake-up packet may be modulated according to OOK (on-off keying). For example, the payload of the wake-up packet may include at least one of a wake-up preamble MAC header (e.g., receiver address or the like), a frame body and an FCS (frame check sequence). Meanwhile, OOK modulation may be performed by modifying an OFDM transmitter.

The LP-WUR 1210 consumes very low power of 100 µW or less, as described above, and may be realized as a small and simple OOK demodulator.

Since the wake-up packet needs to be designed to be compatible with a wireless LAN system, the wake-up packet can include a preamble (e.g., OFDM) of the legacy wireless LAN and a new LP-WUR signal waveform (e.g., OOK).

Figure 13:
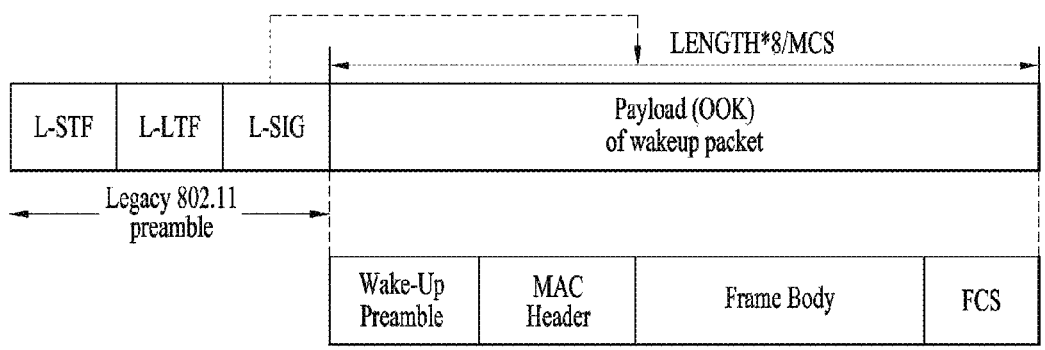
FIG. 13 illustrates an example of a wake-up packet.

FIG. 13 illustrates an example of a wake-up packet. The wake-up packet of FIG. 13 includes a legacy wireless LAN preamble for coexistence with legacy STAs.

Referring to FIG. 13, the legacy wireless LAN preamble may include L-STF, L-LTF and L-SIG. A wireless LAN STA (e.g., 3rd Party) can detect the beginning of the wake-up packet through L-STF. Further, the wireless LAN STA (e.g., 3rd Party) can recognize the end of the wake-up packet through L-SIG. For example, the L-SIG field can indicate the length of a payload (e.g., OOK modulated) of the wake-up packet.

The payload of the wake-up packet may include at least one of a wake-up preamble, a MAC header, a frame body and an FCS. The wake-up preamble may include a PN sequence, for example. The MAC header may include a receiver address. The frame body may include other information necessary for wake-up. The FCS may include a cyclic redundancy check (CRC).

Figure 14:
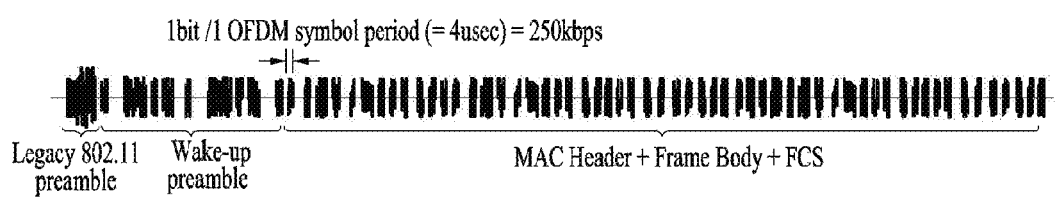
FIG. 14 illustrates a waveform with respect to a wake-up packet.

FIG. 14 illustrates a waveform with respect to the wake-up packet of FIG. 13. Referring to FIG. 14, 1 bit per OFDM symbol length (e.g., 4 µs) can be transmitted in a payload of an OOK modulated wake-up packet. Accordingly, a data rate of the payload of the wake-up packet may be 250 kbps.

Figure 15:
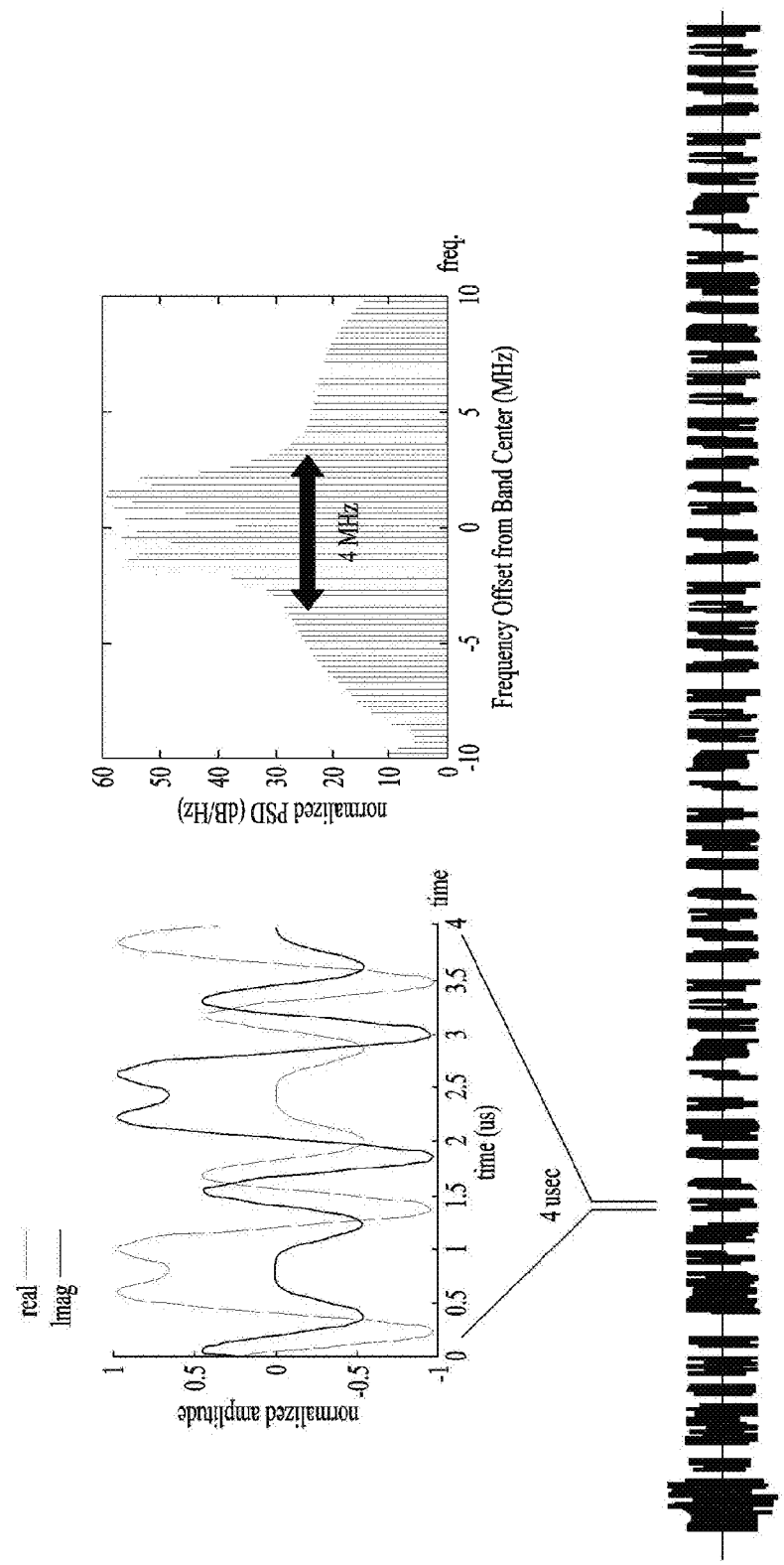
FIG. 15 is a diagram for describing a wake-up packet generated using an OFDM transmitter of a wireless LAN.

FIG. 15 is a diagram for describing generation of a wake-up packet using an OFDM transmitter of a wireless LAN. While a phase shift keying (PSK)-OFDM transmission technique is used in a wireless LAN, generation of a wake-up packet by adding a separate OOK modulator for OOK modulation increases transmitter implementation costs. Accordingly, a method of generating an OOK modulated wake-up packet by reusing an OFDM transmitter is described.

According to the OOK modulation method, a bit value 1 is modulated into a symbol (i.e., on) having power of equal to or greater than a threshold value and a bit value 0 is modulated into a symbol (i.e., off) having power of less than the threshold value. Of course, the bit value 1 may be defined as power off.

In this manner, the bit values 1/0 are indicated through power on/off at corresponding symbol positions in the OOK modulation method. Such simple OOK modulation/demodulation methods can reduce power consumed for signal detection/demodulation of a receiver and costs for realizing the same. Further, OOK modulation for signal on/off may be performed by reusing a legacy OFDM transmitter.

The left graph of FIG. 15 shows the real part and the imaginary part of a normalized amplitude for 1 symbol period (e.g., 4 µs) with respect to bit value 1 that has been OOK modulated by reusing an OFDM transmitter of a legacy wireless LAN. An OOK modulation result with respect to bit value 0 corresponds to power off and thus it is not illustrated.

The right graph of FIG. 15 shows a normalized power spectral density (PSD) on the frequency domain with respect to bit value 1 that has been OOK modulated by reusing the OFDM transmitter of the legacy wireless LAN. For example, 4 MHz at the center of the corresponding band may be used for the LO-WUR. Although it is assumed that the LP-WUR operates in 4 MHz bandwidth in FIG. 15, this is for convenience of description and frequency bandwidths in different sizes may be used. However, it is desirable that the LP-WUR operate in a narrow bandwidth rather than in an operating bandwidth of a legacy wireless LAN for power reduction.

In FIG. 15, it is assumed that a subcarrier width (e.g., subcarrier spacing) is 312.5 kHz and a bandwidth of an OOK pulse corresponds to 13 subcarriers. As described above, 13 subcarriers correspond to about 4 MHz (i.e., 4.06 MHz=13*312.5 kHz).

When an input sequence of IFFT (inverse fast Fourier transform) is defined as s={13 subcarrier tone sequence} in a legacy OFDM transmitter, IFFT for the sequence s is performed such that $X_t$=IFFT(s) and then a cyclic prefix (CP) having a length of 0.8 μs is attached thereto, a symbol length of about 4 μs is obtained.

A wake-up packet may be simply referred to as a WUR signal or a WUR packet.

Hereinafter, a wake-up radio (WUR) signal transmission method for reducing the influence of an overlapping BSS signal and interference is proposed.

A WUR signal is transmitted using some consecutive subcarriers in the entire bandwidth (e.g., wireless LAN bandwidth). For example, a signal may not be transmitted on subcarriers other than subcarriers in which a WUR signal is transmitted in the entire bandwidth. Since a WUR signal uses only a part (e.g., a narrow band) of the entire bandwidth, the WUR signal can be transmitted by setting a transmission band as in a method described later in order to reduce the influence of interference.

For example, when it is assumed that the number of subcarriers used to transmit a WUR signal is K and the number of subcarriers in the entire bandwidth is N, the number of sub-bands for WUR signal transmission can be derived as represented by mathematical expression 1.

$$N\_sub\_band=floor[N/K]$$ [Mathematical expression 1]

The number of sub-bands may be determined according to the number of subcarriers used for WUR transmission. For example, 52 subcarriers can be used when guard and DC subcarriers are excluded from a total of 64 subcarriers included in the entire bandwidth of 20 MHz. If a WUR signal is transmitted through 13 subcarriers (e.g., 4 MHz), a total of 4 sub-bands available for WUR transmission is present in the bandwidth of 20 MHz.

A sub-bands used for WUR packet transmission may be a 2/4/5/10/20 MHz channel band, for example. In addition, the number of available subcarriers for the corresponding channel band may vary according to the numerology of 802.11 system to be used. For example, the number of available subcarriers may be 6, 13, 16, 32 or 64 when it is based on IEEE 802.11a numerology.

Figure 16:
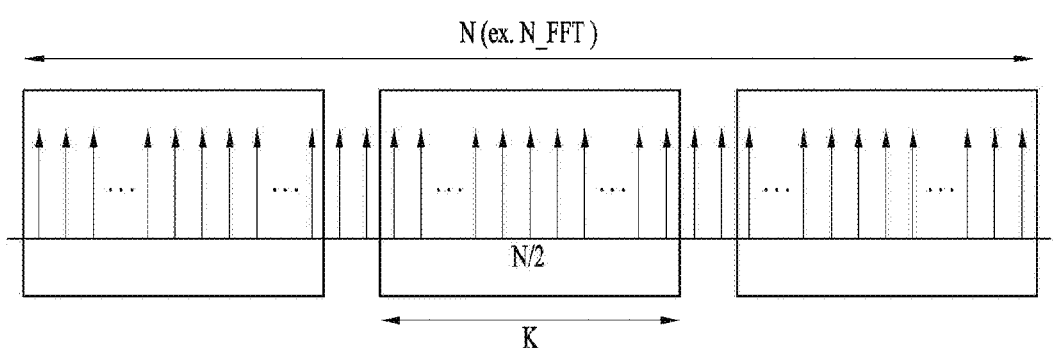
FIG. 16 illustrates an example of sub-band configuration for a WUR signal.

Subcarriers that are not included in sub-bands determined by K in mathematical expression 1 may be used as a guard tone between sub-bands, as shown in FIG. 16. For example, when the number of subcarriers available for WUR is M and each sub-band for WUR includes L subcarriers, Mod(M, L) subcarriers can be set to a guard tone between sub-bands. "Mod" refers to a modulo operation.

Since BSSs can transmit WLAN signals in different bandwidths, a band for WUR transmission may be set based on a specific bandwidth (e.g., 20/40/80 MHz channel) or may be set in consideration of a bandwidth used by a corresponding BSS for transmission.

The aforementioned sub-band refers to a subcarrier set composed of subcarriers used to transmit a WUR signal, and the term "sub-band" may be changed according to system numerology.

Next, proposals for WIR signal transmission with respect to a plurality of bands/sub-bands will be described. Proposals described later may be independently performed or may be combined and performed.

Proposal 1

BSSs transmit WUR signals using different bands/sub-bands. Here, transmission bands/sub-bands may be determined using IDs of the BSSs. An ID of a BSS may be BSS color or BSSID but it is not limited thereto.

When a plurality of sub-bands are present in transmission bandwidths (e.g., 20/40/80 MHz) of BSSs and the number of sub-bands is assumed to be N_S, the index of a sub-band to be used for WUR transmission in an available bandwidth of each BSS can be determined as represented by mathematical expression 2.

$$Index\_Sub\_band=mod(BSS\ ID,\ N\_S)$$ [Mathematical expression 2]

For example, when a transmitter transmits a WUR signal in 20 MHz, a sub-band index can be determined through a modulo operation performed on a BSS ID (e.g., BSSID or BSS color) and the number of sub-bands for WUR packet transmission.

Alternatively, a sub-band index may be determined through mod(BSS ID such as BSS color, the number of subcarriers for WUR packet transmission), mod(STA ID such as AID, the number of subcarriers for WUR packet transmission) or mod(STA ID such as AID, the number of sub-bands for WUR packet transmission). However, the present invention is not limited thereto.

Information about a band in which a WUR signal will be transmitted may be transmitted by an AP through a beacon frame or indicated through a TIM.

Since an AP/STA transmits and receives WIR signals using different sub-bands for BSSs in this manner, the influence of interference due to OBSS WUR signal transmission can be reduced during WUR transmission (e.g., randomization of interference).

On the other hand, a WUR signal may be transmitted using a sub-band having the same index as a primary 20 MHz BW channel index of a BSS. The primary 20 MHz channel index may be an index in a maximum BW of a BSS or an index of a 20 MHz channel at 5 GH. If when the primary 20 MHz channel index is greater than the number of sub-bands for WUR packet transmission in 20 MHz, a sub-band index may be determined using a mod operation. For example, when WUR signals are transmitted through a WUR sub-band determined using a sub-band having the same index as a primary channel index or the primary channel index, WUR signals can be transmitted using different WUR sub-bands for BSSs because signals are transmitted using different primary channels for BSSs.

In addition, an STA can be aware of sub-band information for WUR signal transmission without additional signaling from an AP by using a WUR channel (e.g., WUR sub-band) corresponding to the same index as a primary channel index.

In this manner, the method of setting a sub-band in a specific bandwidth may be used to determine a 20 MHz channel in which a sub-band for WUR transmission will be set in a BSS. For example, a BSS using a bandwidth of 80 MHz can use four 20 MHz bands, and a 20 MHz band for WUR signal transmission may be selected from the four 20 MHz bands through the above-described method.

A band/sub-band for WUR transmission may use a primary 20 MHz channel of a wireless LAN (e.g., primary radio) or correspond to a sub-band in the primary 20 MHz channel.

Alternatively, a band/sub-band for WUR transmission may be determined using a secondary 20 MHz channel of a wireless LAN (e.g., primary radio). For example, WUR signals may be transmitted using a secondary 20 MHz channel in order to prevent signal transmission from excessively concentrating on the primary 20 MHz channel Meanwhile, the primary 20 MHz channel is a channel used to transmit a frame of 20 MHz and may be in neighborhood with a secondary 20 MHz channel. The primary 20 MHz channel may constitute a primary 40 MHz channel with a secondary 20 MHz channel, and the primary 40 MHz channel may be used to transmit a frame of 40 MHz. Distinguishing a primary channel from a secondary channel is for the purpose of determining a channel to be preferentially used in frame transmission and/or a CCA procedure. Refer to IEEE 802.11 document for details.

Proposal 2

According to an embodiment of the present invention, a WUR signal may be transmitted based on band/sub-band hopping. For example, a WUR signal may be frequency-hopped.

For example, a band/sub-band for WUR signal transmission may be set using different hopping sequences for BSSs.

A hopping sequence may be determined through a BSS and/or a BSSID.

A hopping sequence may be applied for hopping between sub-bands/resource units (RUs) during WUR packet transmission in 20 MHz, for example. Alternatively, a hopping sequence may be used for hopping between 20 MHz channels when 20 MHz is used for WUR packet transmission in a conventional wide bandwidth of 2.4/5 GHz.

At 5 GHz, a wireless LAN (e.g., Wi-Fi) signal may be transmitted using one of UNII-1, UNII-2A, UNII-2C and UNII-3. Accordingly, a transmitter operating at 5 GHz can select one of four bands using a hopping sequence and transmit a WUR signal. A WUR signal transmission band may differ from a wireless LAN signal transmission band. Further, a sub-band/RU in a 20 MHz channel or a primary 20 MHz channel or a sub-band/RU in a dedicated 20 MHz channel for WUR signal transmission in a selected band may be determined through a hopping sequence.

In another embodiment, channels overlap in a band of 2.4 GHz. Accordingly, a WUR signal can be transmitted using channels which do no overlap among channels defined in the band of 2.4 GHz, that is, common channels (e.g., channels #1, #6 and #11). Here, the aforementioned hopping sequence may be used to prevent channels used in BSSs from overlapping.

As another embodiment, a hopping sequence may be used to select one of specific frequency bands. For example, a WUR signal can be transmitted using a gap between common channels over which a control signal is transmitted at 2.4 GHz. Specifically, a WUR signal can be transmitted through a gap between channels #1 and #6, a gap between channels #6 and #11, and a band having a specific size after channel #11. Such gaps may have a size of 3 MHz. Further, the gap size may increase to 5 MHz when the size of a 20 MHz channel is considered. Which one of gaps between common channels will be used for WUR signal transmission can be determined through a frequency hopping sequence.

Since different hopping sequences are used for respective BSSs as described in the above proposal, it is possible to prevent BSSs from transmitting WUR signals using the same band/sub-band and reduce interference between BSSs with respect to WUR transmission.

A hopping sequence may be signaled to an STA through a beacon frame or provided when the STA associates with an AP.

A band/sub-band hopping interval for WUR signal transmission may be transmitted through a beacon frame. Further, a WUR band/sub-band hopping interval may be the same as a beacon frame interval or may be set to a maximum PPDU size of a wireless LAN.

Proposal 3

According to an embodiment of the present invention, an AP may perform CCA for WUR bands/sub-bands used around the AP and then set an idle band/sub-band as a WUR band/sub-band thereof.

In this manner, the AP can perform CCA for WUR signal transmission and the following methods may be used in response to the size of a band/sub-band for WUR packet transmission.

(i) When a WUR signal is transmitted using a 20 MHz band, an AP/STA may use a CCA threshold value defined in 802.11. For example, −82 dBm set for a primary 20 MHz channel or a −79 dBm set for a secondary 20 MHz channel may be used as a CCA threshold value for WUR. Such a CCA threshold value is defined for wireless LAN (e.g., Wi-Fi) signals. If a WUR signal is regarded as a signal which is not a wireless LAN signal, an energy detection level used in conventional wireless LAN systems may be used as a threshold value for WUR signals. In this case, a threshold value of −62 dBm may be used as a CCA threshold value for WUR with respect to 20 MHz channels.

(ii) When a WUR packet is transmitted using a narrow band (e.g., sub-band) in a band of 20 MHz, an AP/STA performs CCA per WUR sub-band (e.g., 2/4/5/10 MHz).

Here, the CCA threshold may vary according to the size of a WUR band/sub-band. For example, Table 1 shows use of CCA threshold values for conventional wireless LANs for WUR and Table 2 shows use of energy detection levels for WUR.

TABLE 1

| Band size | CCA value |
| --- | --- |
| 2 | −92 dBm |
| 4 | −89 dBm |
| 5 | −88 dBm |
| 10 | −85 dBm |

TABLE 2

| Band size | CCA value |
| --- | --- |
| 2 | −82 dBm |
| 4 | −79 dBm |
| 5 | −78 dBm |
| 10 | −75 dBm |

Meanwhile, a CCA threshold value for WUR may be set to be lower than CCA threshold values of conventional wireless LANs in consideration of a modulation scheme (e.g., OOK) used for WUR signal transmission.

When the AP/STA transmit WUR packets based on CCA, the AP/STA avoid WUR bands/sub-bands used by neighboring APs/STAs and use other bands/sub-bands, and thus the influence of interference can be reduced.

The AP/STA can signal information about a set WUR band/sub-band through a control frame, a trigger frame and/or a polling frame.

Further, the sizes of bands/sub-bands used to transmit WUR packets in BSSs or between BSSs may be the same or different.

(1) Intra BSS

A BSS may vary the size of a band/sub-band for WUR transmission according to channel state. For example, a BSS can transmit WUR packets using a narrow band in a deteriorated channel state and transmit WUR packets using a wide band in a good channel state. When a wide band is used, a data rate can be improved.

To simultaneously wake multiple STAs up in a BSS, an AP/STA can transmit multiple WUR packets. The WUR packets may be transmitted using multiple bands/sub-bands. For example, three bands/sub-bands may be used to wake three STAs up and the bands/sub-bands may have the same size or different sizes.

The size of a band/sub-band for WUR packet transmission/reception may be determined according to STA capability.

(2) Inter BSS

Different WUR band/sub-band sizes may be set for BSSs. For example, WUR packets may be transmitted using 5 MHz in BSS 1 and WUR packets may be transmitted using 10 MHz in BSS2.

The size of a WUR band/sub-band may be varied according to channel state as in the aforementioned intra BSS case.

The size of a WUR band/sub-band or the number of subcarriers may be determined according to the size of a transmission band supported by a BSS or the size of a wireless LAN transmission band.

Proposal 4

According to an embodiment of the present invention, different BSSs may transmit WUR packets using a common WUR band/sub-band (e.g., the same location and the same size).

When WUR signals are transmitted in this manner, even if BSSs change, an STA can receive a WUR signal without associating with a changed BSS and can be aware of WUR configuration information through WUR signal reception.

If all BSSs transmit WUR signals using the same band/sub-band, the STA can receive WUR signals without additional signaling with respect to WUR configuration information.

An AP of each BSS can transmit WUR packet information using a determined WUR band at predetermined intervals, and when the AP wakes a specific STA up, the AP can transmit a WUR signal with respect to the specific SPA.

Since the AP transmits WUR signals in the same band/sub-band and at the same position, an STA in a BSS can detect a corresponding WUR signal and determine presence or absence of a WUR signal transmitted thereto.

When the AP varies the positions and sizes of WUR bands/sub-bands as described in the above proposals 1 to 3, the AP can transmit WUR configuration information for WUR signal transmission, for example, the positions of bands/sub-bands, band/sub-band size information, band/sub-band hopping sequence information, and the like, to STAs through a fixed common channel band/sub-band.

Proposal 5

Although transmission of WUR signals using a specific sub-band in a wireless LAN band has been proposed above, a transmitter may transmit WUR signals using all of a plurality of sub-bands. For example, when a transmitter is an AP, the AP can simultaneously transmit WUR signals for a plurality of STAs through different sub-bands. WUR signals transmitted through respective sub-bands may be for different STAs. An STA may receive information about a band/sub-band in which a WUR signal will be received through a wireless LAN signal, receive the information when associating with a BSS or receive the information during capability negotiation. Here, a WUR signal transmitted through each band/sub-band may be phase-rotated or cyclically shifted for each band/sub-band to be prevented from being mis-detected. Alternatively, different WUR sequences may be used for STAs.

Here, for WUR signal detection, each STA may perform cross-correlation using a sequence determined therefor and then apply energy detection (ED).

When a transmitter transmits WUR signals using multiple bands/sub-bands, preambles of WUR signals used for the bands/sub-bands may have different lengths. For example, a preamble length of a WUR signal may be determined through a sub-band index. Specifically, when four sub-bands are present in 20 MHz, a preamble length of a WUR signal in each sub-band may be sub-band index +1 or 2. However, the present invention is not limited thereto.

Method for Signaling WUR Configuration Information for WUR Signal Transmission

Next, exemplary methods for signaling, by an AP, WUR configuration information for WUR signal transmission to an STA will be described.

(1) Method of Using a Beacon Frame of a Wireless LAN

An STA can receive a beacon frame transmitted from an AP and receive WUR configuration information using a WUR field included in the beacon frame as in 802.11.

The WUR configuration information may include WUR band/sub-band information, for example. For example, WUR band information may include WUR band/sub-band allocation, a WUR band/sub-band size, a threshold value and/or hopping information, and the like. For example, the threshold value may be a threshold value for envelope detection (ED) for determining whether an OOK-modulated WUR signal is received when the WUR signal is received. The AP may transmit, to the STA, the threshold value to be used for the STA to determine presence or absence of a WUR signal when performing ED. The threshold value may vary according to channel state.

(2) Method of Receiving WUR Configuration Information through a Control Frame or a Management Frame when an STA Associates with an AP in a BSS In a process through which an STA performs association with an AP in a BSS, the STA performs capability negotiation and the AP/STA can check whether WUR signals can be transmitted and received therebetween through the capability negotiation. When the AP/STA support WUR signal transmission and reception, the AP can transmit WUR configuration information necessary for WUR signal transmission through a control frame and/or a management frame.

The WUR configuration information transmitted through a control frame and/or a management frame may include at least one of band/sub-band allocation, a band/sub-band size, a band/sub-band hopping sequence and a band/sub-band index. However, the present invention is not limited thereto.

(3) Method of Transmitting, by an AP in a BSS, WUR Configuration Information Using a WUR Control Channel An AP of each BSS may transmit WUR configuration information, for example, at least one of band/sub-band allocation, a band/sub-band size, a band/sub-band hopping sequence and a band/sub-band index, through a fixed band/channel in order to transmit and receive WUR signals in the corresponding BSS. A WUR control channel may correspond to a control frame transmitted over a primary channel, for example. However, the present invention is not limited thereto.

To acquire the WUR configuration information before an STA associates with the AP, the WUR configuration information may be transmitted through a dedicated channel.

The same dedicated channel may be set irrespective of BSSs.

For example, a primary 20 MHz channel may be used as the dedicated channel.

A fixed size and the same allocation may be used for such a channel carrying a WUR signal for the WUR configuration information regardless of BSSs.

A channel for the WUR configuration information may have a size identical to or different from the size of a band/sub-band in which WUR packets are transmitted. For example, although a channel carrying WUR configuration information for all STAs in a BSS is 5 MHz, a WUR packet for a specific STA may be transmitted using 10 MHz.

The WUR configuration information may be transmitted at a specific period. For example, the WUR configuration information may be transmitted at a period identical to or longer than a beacon frame period.

Figure 17:
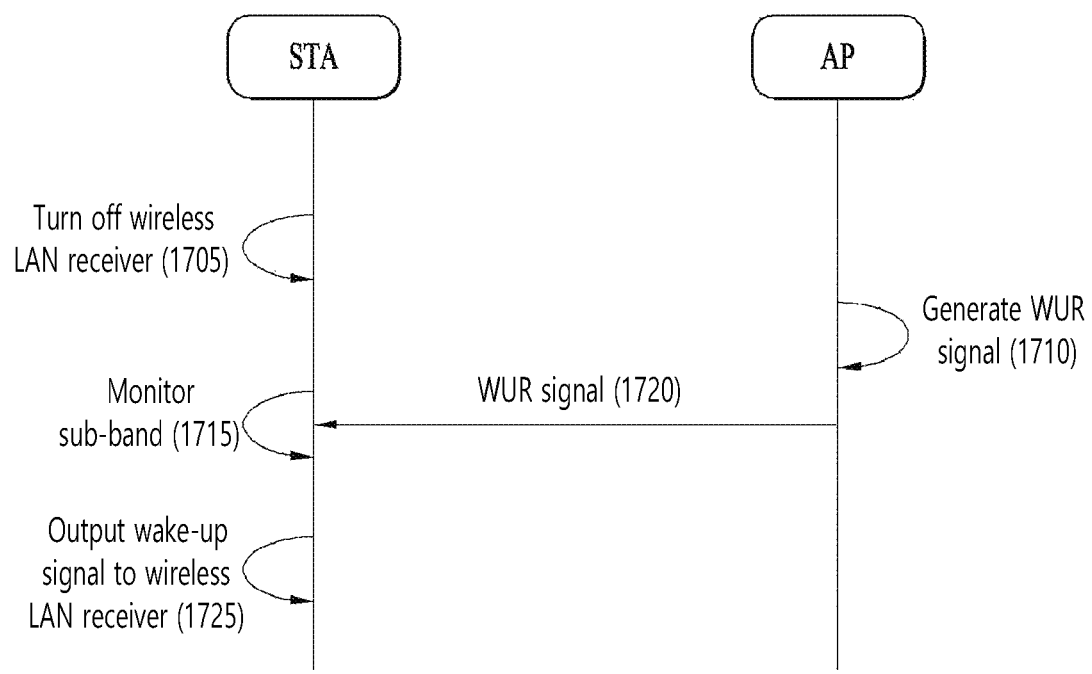
FIG. 17 illustrates a flow of a method for transmitting and receiving a WUR signal according to an embodiment of the present invention.

FIG. 17 illustrates a flow of a method for transmitting and receiving a WUR signal according to an embodiment of the present invention. Redundant description will be omitted.

Referring to FIG. 17, an STA turns off a wireless LAN receiver (1705). The STA monitors at least one of a plurality of sub-bands included in a wireless LAN band through a WUR receiver (1715).

An AP generates a WUR signal including a wireless LAN preamble and a WUR payload (S1710). The AP transmits a WUR signal to the STA (station) with the wireless LAN receiver turned off through at least one of the plurality of sub-bands included in the wireless LAN band (1720). The WUR payload may include at least one of a WUR preamble, a MAC header, a frame body and FCS.

The STA outputs a wake-up signal to the wireless LAN receiver through the WUR receiver when a WUR signal for the STA is detected as a result of monitoring at least one sub-band (1725). Then, the STA can transmit/receive wireless LAN signals to/from the AP in a wake-up state.

A WUR signal includes a wireless LAN preamble transmitted according to OFDM (orthogonal frequency divisional multiplex) and a WUR payload transmitted according to OOK (on-off keying). For example, the WUR payload can be transmitted by reusing an OFDM transmitter of the AP for the wireless LAN preamble through OOK (on-off keying).

The STA acquires only the WUR payload other than the wireless LAN preamble by detecting the WUR signal based on OOK.

At least one sub-band monitored by the STA may be determined to be specific to a BSS (basic service set) with which the STA is associated. For example, at least one sub-band monitored by the STA may be determined through a BSSID (BSS identifier) or BSS color of a BSS. At least one sub-band monitored by the STA may be determined based on "MOD(L, N_S)". Here, "L" represents a BSSID or a BSS color, "N_S" represents the number of sub-bands included in a wireless LAN band, and "MOD" represents a modulo operation. The number of sub-bands may be determined based on an mathematical expression of "floor[N/K]". Here, "N" is the number of subcarriers included in the wireless LAN band and "K" is the number of subcarriers used for WUR signal transmission.

The STA may monitor WUR signals while hoppling at least two sub-bands among the plurality of sub-bands. Hopping at least two sub-bands may be performed based on the BSSID (BSS identifier) or BSS color of the BSS.

The STA may receive WUR configuration information including at least one of allocation information about a plurality of sub-bands, sub-band size information and sub-band hopping information from the AP (Access Point). The WUR configuration information may be acquired from a beacon frame, a control frame or a management frame received through the wireless LAN receiver of the STA instead of the WUR receiver of the STA.

WUR signals for other STAs may be transmitted over sub-bands other than the at least one sub-band over which the WUR signal for the STA is transmitted among the plurality of sub-bands.

Figure 18:
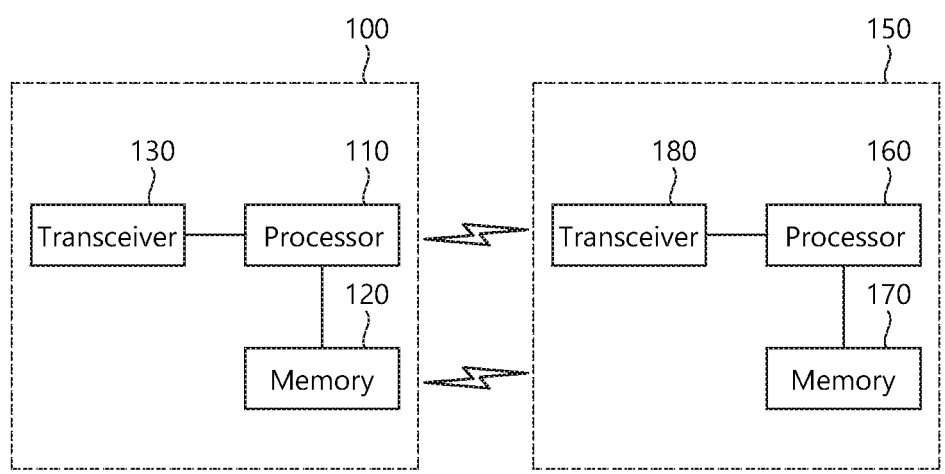
FIG. 18 is a diagram for describing a device according to an embodiment of the present invention.

FIG. 18 is a diagram for describing a device for realizing the above-described method.

A wireless device 800 shown in FIG. 18 may correspond to a specific STA described above and a wireless device 850 may correspond to an AP described above.

The STA 800 may include a processor 810, a memory 820 and a transceiver 830 and the AP 850 may include a processor 860, a memory 870 and a transceiver 880. The transceivers 830 and 880 may transmit/receive wireless signals and may be implemented the physical layer such as IEEE 802.11/3GPP. The processor 810 and 860 are implemented in the physical layer and/or the MAC layer and connected to the transceivers 830 and 880. The processors 810 and 860 may perform the aforementioned UL MU scheduling procedure.

The processors 810 and 860 and/or the transceivers 830 and 880 may include an application-specific integrated circuit (ASIC), other chipsets, a logic circuit and/or a data processor. The memories 820 and 870 may include read-only memory (ROM), a random access memory (RAM), a flash memory, a memory card, a storage medium and/or other storage units. When an embodiment is executed by software, the above-described method may be performed by modules (e.g., a processor and a function) which perform the above-described functions. The modules may be stored in the memories 820 and 870 and executed by the processors 810 and 860. The memories 820 and 870 may be disposed inside or outside of the processors 810 and 860) and connected to the processors 810 and 860 through a known means.

The transceiver 830 of the STA may include a transmitter (not shown) and a receiver (not shown). The receiver may include a wireless LAN receiver for receiving wireless LAN signals and a WUR receiver for receiving WUR signals.

The transceiver 880 of the AP may include a transmitter (not shown) and a receiver (not shown). The transmitter of the AP may correspond to an OFDM transmitter. The AP may transmit a WUR payload according to OOK by reusing the OFDM transmitter. For example, the AP may OOK-modulate the WUR payload through the OFDM transmitter, as described above.

In the above exemplary systems, although the methods have been described on the detailed description of the preferred embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

The present invention can be applied to various wireless communication systems including IEEE 802.11.

What is claimed is:

1. A method for receiving, by a station (STA), a wake-up receiver (WUR) signal in a wireless LAN system, the method comprising:
monitoring at least one of a plurality of sub-bands included in a wireless LAN band through a WUR receiver of the STA in a state in which a wireless LAN receiver of the STA is turned off; and outputting the WUR signal to the wireless LAN receiver through the WUR receiver of the STA when the WUR signal for the STA is detected as a result of monitoring the at least one sub-band, wherein the WUR signal includes a wireless LAN preamble transmitted in an orthogonal frequency division multiplex (OFDM) scheme and a WUR payload transmitted in an on-off keying (OOK) scheme, the STA detects the WUR signal based on the OOK scheme, thereby acquiring only the WUR payload other than the wireless LAN preamble, and at least one sub-band monitored by the STA is determined to be specific to a basic service set (BSS) with which the STA is associated, and wherein at least one sub-band monitored by the STA is determined through a BSS identifier (BSSID) or a BSS color of the BSS.

2. The method of claim 1, wherein at least one sub-band monitored by the STA is determined based on a first mathematical expression of "MOD(L, N_S)", wherein "L" represents the BSSID or the BSS color, "N_S" represents the number of sub-bands included in the wireless LAN band, and "MOD" represents a modulo operation in the first mathematical expression, wherein the number of sub-bands is determined based on a second mathematical expression of "floor[N/K]", wherein "N" is the number of subcarriers included in the wireless LAN band and "K" is the number of subcarriers used for WUR signal transmission in the second mathematical expression.

3. The method of claim 1, wherein the STA monitors the WUR signal while hopping at least two sub-bands among the plurality of sub-bands.

4. The method of claim 3, wherein the hopping of at least two sub-bands is performed based on the BSSID or the BSS color of the BSS.

5. The method of claim 3, further comprising:

receiving, from an access point (AP) of the BSS, WUR configuration information including at least one of allocation information about the plurality of sub-bands, sub-band size information and sub-band hopping information.

6. The method of claim 5, wherein the WUR configuration information is acquired from a beacon frame, a control frame or a management frame received through the wireless LAN receiver instead of the WUR receiver.

7. A station (STA) for receiving a wake-up receiver (WUR) signal in a wireless LAN system, comprising:

a wireless LAN receiver for receiving a wireless LAN signal; and a WUR receiver for monitoring at least one of a plurality of sub-bands included in a wireless LAN band in a state in which the wireless LAN receiver is turned off and outputting the WUR signal to the wireless LAN receiver when the WUR signal for the STA is detected as a result of monitoring the at least one sub-band, wherein the WUR signal includes a wireless LAN preamble transmitted in an orthogonal frequency division multiplex (OFDM) scheme and a WUR payload transmitted in an on-off keying (OOK) scheme, the WUR receiver detects the WUR signal based on the OOK scheme, thereby acquiring only the WUR payload other than the wireless LAN preamble, and at least one sub-band monitored by the WUR receiver is determined to be specific to a basic service set (BSS) with which the STA is associated, and wherein at least one sub-band monitored by the STA is determined through a BSS identifier (BSSID) or a BSS color of the BSS.

8. A method for transmitting, by an access point (AP), a wake-up receiver (WUR) signal in a wireless LAN system, the method comprising:

generating the WUR signal including a wireless LAN preamble and a WUR payload; and transmitting the WUR signal to a station (STA) with a wireless LAN receiver turned off through at least one of a plurality of sub-bands included in a wireless LAN band, wherein the wireless LAN preamble is transmitted in an orthogonal frequency division multiplex (OFDM) scheme, the WUR payload is transmitted by reusing an OFDM transmitter of the AP for the wireless LAN preamble in an on-off keying (OOK) scheme, and at least one sub-band through which the WUR signal is transmitted is determined to be specific to a basic service set (BSS) operated by the AP, and wherein at least one sub-band monitored by the STA is determined through a BSS identifier (BSSID) or a BSS color of the BSS.

9. The method of claim 8, wherein at least one sub-band through which the WUR signal is transmitted is determined based on a first mathematical expression of "MOD(L, N_S)", wherein "L" represents the BSSID or the BSS color, "N_S" represents the number of sub-bands included in the wireless LAN band, and "MOD" represents a modulo operation in the first mathematical expression, wherein the number of sub-bands is determined based on a second mathematical expression of "floor[N/K]", wherein "N" is the number of subcarriers included in the wireless LAN band and "K" is the number of subcarriers used for WUR signal transmission in the second mathematical expression.

10. The method of claim 8, wherein the AP transmits the WUR signal while hopping at least two sub-bands among the plurality of sub-bands.

11. The method of claim 10, wherein the hopping of at least two sub-bands is performed based on the BSSID (BSS identifier) or the BSS color of the BSS.

12. The method of claim 10, further comprising transmitting WUR configuration information including at least one of allocation information about the plurality of sub-bands, sub-band size information and sub-band hopping information.

13. The method of claim 8, wherein WUR signals for other STAs are transmitted over sub-bands other than at least one sub-band over which the WUR signal for the STA is transmitted among the plurality of sub-bands.

* * * * *